(12) United States Patent
Casu et al.

(10) Patent No.: US 12,455,178 B2
(45) Date of Patent: Oct. 28, 2025

(54) INDUCTIVE LINEAR STROKE SENSOR USING DUAL TRACKS WITH DIFFERENT PERIODICITY

(71) Applicant: Allegro MicroSystems, LLC, Manchester, NH (US)

(72) Inventors: Emanuele Andrea Casu, Annecy (FR); Ross Eisenbeis, Litchfield, NH (US); Solène Bastien, Naves-Parmelan (FR)

(73) Assignee: Allegro MicroSystems, LLC, Manchester, NH (US)

( * ) Notice: Subject to any disclaimer, the term of this patent is extended or adjusted under 35 U.S.C. 154(b) by 165 days.

(21) Appl. No.: 18/394,642

(22) Filed: Dec. 22, 2023

(65) Prior Publication Data

US 2025/0207949 A1 Jun. 26, 2025

(51) Int. Cl.
*G01D 5/20* (2006.01)
(52) U.S. Cl.
CPC .................. *G01D 5/2053* (2013.01)
(58) Field of Classification Search
CPC .. G01D 5/2046; G01D 5/2053; G01D 5/2216; G01D 5/2225; G01D 5/145; G01D 5/2033; G01D 5/2241
USPC ............................... 324/200, 207.11, 207.24
See application file for complete search history.

(56) References Cited

U.S. PATENT DOCUMENTS

| | | |
|---|---|---|
| 3,647,963 A | 3/1972 | Bailey |
| 4,356,732 A | 11/1982 | Hachtel et al. |
| 4,556,886 A | 12/1985 | Shimizu et al. |
| 4,820,961 A | 4/1989 | McMullin |
| 4,853,604 A | 8/1989 | McMullin et al. |
| 5,592,058 A | 1/1997 | Archer et al. |
| 5,841,274 A | 11/1998 | Masreliez et al. |
| 5,905,350 A | 5/1999 | Hofbauer et al. |
| 6,373,307 B1 | 4/2002 | Takai |

(Continued)

FOREIGN PATENT DOCUMENTS

| | | |
|---|---|---|
| CN | 1950676 | 4/2007 |
| CN | 105634361 A | 6/2016 |

(Continued)

OTHER PUBLICATIONS

Response to Search Opinion filed on Jul. 3, 2024 for European Application No. 23177829.1, 27 pages.

(Continued)

*Primary Examiner* — Roberto Velez
(74) *Attorney, Agent, or Firm* — Daly, Crowley, Mofford & Durkee, LLP

(57) ABSTRACT

A system including: a target having a first track and a second track, a first receiving coil that is aligned with the first track, the first receiving coil having a first period length; a second receiving coil that is aligned with the first track the second receiving coil having a second period length; a third receiving coil that is aligned with the second track the third receiving coil having a third period length; and a fourth receiving coil that is aligned with the second track, the fourth receiving coil having a first period length; and a magnetic field sensor that is configured to generate an output signal that is indicative of a position of the target, wherein the respective target length is less than any of the first period length, the second period length, the third period length, and the fourth period length.

30 Claims, 13 Drawing Sheets

(56) References Cited

U.S. PATENT DOCUMENTS

| | | | |
|---|---|---|---|
| 6,525,531 B2 | 2/2003 | Forrest et al. | |
| 6,556,153 B1 | 4/2003 | Cardamone | |
| 6,828,783 B2 | 12/2004 | Schroter et al. | |
| 6,999,007 B2* | 2/2006 | Lin | G01D 5/208 341/20 |
| 7,362,094 B2 | 4/2008 | Voisine et al. | |
| 7,772,838 B2 | 8/2010 | Bailey et al. | |
| 8,280,568 B2 | 10/2012 | Nakatsu et al. | |
| 8,453,518 B2 | 6/2013 | Diekmann et al. | |
| 8,917,043 B2 | 12/2014 | Reynolds et al. | |
| 8,917,044 B2 | 12/2014 | Reynolds et al. | |
| 9,194,884 B1 | 11/2015 | Mossman et al. | |
| 9,329,057 B2 | 5/2016 | Foletto et al. | |
| 9,411,023 B2 | 8/2016 | Friedrich et al. | |
| 9,780,706 B2 | 10/2017 | Allegrini et al. | |
| 9,983,045 B2 | 5/2018 | O'Neill | |
| 10,145,908 B2 | 12/2018 | David et al. | |
| 10,310,028 B2 | 6/2019 | Latham et al. | |
| 10,330,499 B2 | 6/2019 | Elliott et al. | |
| 10,380,879 B2 | 8/2019 | Haas et al. | |
| 10,564,007 B2 | 2/2020 | Maniouloux et al. | |
| 10,580,289 B2 | 3/2020 | Haas et al. | |
| 10,636,285 B2 | 4/2020 | Haas et al. | |
| 10,692,362 B2 | 6/2020 | Petrie et al. | |
| 10,705,560 B1 | 7/2020 | Petrie et al. | |
| 10,802,133 B2 | 10/2020 | Hammerschmidt et al. | |
| 10,816,366 B2 | 10/2020 | Weiland et al. | |
| 10,837,847 B2 | 11/2020 | Smith, Jr. | |
| 10,837,848 B2 | 11/2020 | Janisch et al. | |
| 10,866,122 B2 | 12/2020 | Weiland et al. | |
| 10,996,289 B2 | 5/2021 | Latham et al. | |
| 11,079,291 B2 | 8/2021 | Bertin | |
| 11,112,275 B2 | 9/2021 | Bertin | |
| 11,303,257 B2 | 4/2022 | Daubert et al. | |
| 11,326,903 B1 | 5/2022 | Casu et al. | |
| 11,333,530 B2 | 5/2022 | Foletto | |
| 11,346,688 B2 | 5/2022 | Stewart | |
| 11,408,755 B2 | 8/2022 | Bertin | |
| 11,460,286 B2 | 10/2022 | Gillet et al. | |
| 11,592,319 B2 | 2/2023 | Ausserlechner | |
| 11,662,260 B2 | 5/2023 | Latham et al. | |
| 11,692,807 B2 | 7/2023 | Ausserlechner | |
| 11,692,887 B2 | 7/2023 | Witts et al. | |
| 11,733,316 B2 | 8/2023 | Casu et al. | |
| 2003/0001537 A1 | 1/2003 | Yang et al. | |
| 2003/0070126 A1 | 4/2003 | Werner et al. | |
| 2003/0127289 A1 | 7/2003 | Elgas et al. | |
| 2004/0232862 A1 | 11/2004 | Wogari et al. | |
| 2005/0007044 A1 | 1/2005 | Qiu et al. | |
| 2005/0122242 A1 | 6/2005 | Inenaga et al. | |
| 2006/0195720 A1 | 8/2006 | Watts | |
| 2006/0250128 A1 | 11/2006 | Tahara et al. | |
| 2007/0001629 A1 | 1/2007 | McGarry et al. | |
| 2007/0145970 A1 | 6/2007 | Takahashi | |
| 2008/0061771 A1 | 3/2008 | Sugiyama et al. | |
| 2009/0254300 A1 | 10/2009 | Schneider et al. | |
| 2009/0315544 A1 | 12/2009 | Takahashi et al. | |
| 2011/0062909 A1 | 3/2011 | Patel et al. | |
| 2011/0309824 A1 | 12/2011 | Takahashi et al. | |
| 2012/0074972 A1 | 3/2012 | Rasbornig et al. | |
| 2012/0211299 A1 | 8/2012 | Yanai | |
| 2013/0106340 A1 | 5/2013 | Chabaud et al. | |
| 2013/0154538 A1 | 6/2013 | Ogawa | |
| 2013/0200909 A1 | 8/2013 | Rasbornig et al. | |
| 2013/0249544 A1 | 9/2013 | Vig et al. | |
| 2013/0277782 A1 | 10/2013 | Doogue et al. | |
| 2014/0028237 A1 | 1/2014 | Park et al. | |
| 2014/0184200 A1 | 7/2014 | Milano et al. | |
| 2014/0285124 A1 | 9/2014 | Derammelaere et al. | |
| 2014/0333241 A1 | 11/2014 | Zhao et al. | |
| 2015/0015241 A1 | 1/2015 | Tamura | |
| 2015/0185279 A1 | 7/2015 | Milano et al. | |
| 2015/0185284 A1 | 7/2015 | Milano et al. | |
| 2015/0185293 A1 | 7/2015 | Milano et al. | |
| 2015/0211895 A1* | 7/2015 | Reitsma | G01D 5/202 324/207.16 |
| 2015/0241523 A1 | 8/2015 | Scherr | |
| 2015/0253153 A1 | 9/2015 | Smithanik et al. | |
| 2015/0354985 A1 | 12/2015 | Judkins, III et al. | |
| 2016/0025820 A1 | 1/2016 | Scheller et al. | |
| 2016/0139199 A1 | 5/2016 | Petrie et al. | |
| 2016/0139229 A1 | 5/2016 | Petrie et al. | |
| 2016/0363638 A1 | 12/2016 | Daubert | |
| 2017/0045380 A1 | 2/2017 | Ueda et al. | |
| 2017/0052208 A1 | 2/2017 | Reddy et al. | |
| 2017/0110652 A1 | 4/2017 | Doogue et al. | |
| 2017/0160102 A1 | 6/2017 | Heumann et al. | |
| 2017/0166251 A1 | 6/2017 | Shao et al. | |
| 2017/0346420 A1 | 11/2017 | Ross et al. | |
| 2018/0138841 A1 | 5/2018 | Campbell et al. | |
| 2018/0214509 A1 | 8/2018 | Desriac et al. | |
| 2018/0274947 A1 | 9/2018 | Maniouloux et al. | |
| 2018/0367073 A1 | 12/2018 | Haas | |
| 2019/0242725 A1 | 8/2019 | Shaga et al. | |
| 2019/0310111 A1 | 10/2019 | Werth et al. | |
| 2019/0331541 A1 | 10/2019 | Janisch et al. | |
| 2020/0109996 A1 | 4/2020 | Smith, Jr. | |
| 2021/0190545 A1 | 6/2021 | Utermoehlen et al. | |
| 2022/0003572 A1 | 1/2022 | Stewart | |
| 2022/0128382 A1 | 4/2022 | Drouin | |
| 2022/0239462 A1 | 7/2022 | Casu et al. | |
| 2022/0357144 A1 | 11/2022 | Tombez | |
| 2023/0152075 A1* | 5/2023 | Pichler | G01L 5/221 324/207.21 |
| 2023/0160722 A1 | 5/2023 | Brajon et al. | |
| 2023/0258515 A1 | 8/2023 | Ostermann et al. | |
| 2023/0332965 A1 | 10/2023 | Casu et al. | |
| 2023/0417579 A1 | 12/2023 | Latham et al. | |

FOREIGN PATENT DOCUMENTS

| | | |
|---|---|---|
| DE | 10 2017 221 883 A1 | 6/2019 |
| DE | 10 2018/220363 A1 | 5/2020 |
| EP | 0289033 A2 | 11/1988 |
| EP | 0 848 489 A2 | 6/1998 |
| EP | 4394331 | 7/2024 |
| JP | H 03231317 A | 10/1991 |
| JP | 2006/067667 A | 3/2006 |
| JP | 2010/045914 A | 2/2010 |
| KR | 101394556 B1 | 5/2014 |
| WO | WO 2006/079793 | 8/2006 |
| WO | WO 2020/072117 | 4/2020 |
| WO | WO 2022/132229 | 6/2022 |

OTHER PUBLICATIONS

U.S. Non-Final Office Action dated Aug. 29, 2024 for U.S. Appl. No. 17/659,224; 18 Pages.

U.S. Appl. No. 18/976,702, filed Dec. 11, 2024, Casu et al.

U.S. Notice of Allowance dated Nov. 12, 2024 for U.S. Appl. No. 17/659,224; 11 Pages.

Response to Office Action dated Jan. 17, 2025, filed on Feb. 10, 2025 for U.S. Appl. No. 17/809,382, 17 pages.

Office Action dated Jun. 4, 2025 for U.S. Appl. No. 18/354,903, 13 pages.

Notice of Allowance dated May 21, 2025 for U.S. Appl. No. 17/809,382, 12 pages.

U.S. Appl. No. 18/354,895, filed Jul. 19, 2023, Richards, et al.

U.S. Appl. No. 18/354,903, filed Jul. 19, 2023, Lassalle-Balier, et al.

U.S. Appl. No. 18/354,903, filed Jul. 31, 2023, Ali, et al.

U.S. Appl. No. 18/475,674, filed Sep. 27, 2023, Casu, et al.

U.S. Appl. No. 18/654,582, filed May 3, 2024, Vuillermet, et al.

Allegro "Precision Hall-Effect Angle Sensor IC" Datasheet No. A1334; A1334A-DS, Rev. 9 MCO-0000465 dated Nov. 2, 2018, 19 pages.

Allegro MicroSystems datasheet ATS696PSM, "Position Sensor IC with Speed and Direction Output", Oct. 7, 2021, 14 pages.

Emadi, McMaster University "Advanced Electric Drive Vehicles", 2015, 3 pages.

(56) References Cited

OTHER PUBLICATIONS

International Standard ISO 26262-1 "Road Vehicles—Functional Safety—Part 1 Vocabulary", Nov. 15, 2011, 30 pages.
International Standard ISO 26262-5 "Road Vehicles—Functional Safety—Part 5 Product development at the hardware level", Nov. 15, 2011, 86 pages.
International Standard ISO 26262-9 "Road Vehicles—Functional Safety—Part 9 Automotive Safety Integrity Level (ASIL)-oriented and safety-oriented analyses", Nov. 15, 2011, 24 pages.
Microchip WebSeminars "Sensorless Field Oriented Control (FOC) for Permanent Magnet Synchronous Motors (PMSM)", 51 pages.
Posic Datasheet "IT3402L Triple Channel Linear Encoder Kit", 2021, 4 pages.
Restriction Requirement dated Apr. 6, 2018 for U.S. Appl. No. 15/622,459, 5 pages.
Response to Restriction Requirement and Preliminary Amendment filed Jun. 1, 2018 for U.S. Appl. No. 15/622,459, 10 pages.
Office Action dated Sep. 17, 2018 for U.S. Appl. No. 15/622,459, 11 pages.
Response to Office Action filed Dec. 10, 2018 for U.S. Appl. No. 15/622,459, 14 pages.
Notice of Allowance dated Mar. 18, 2019 for U.S. Appl. No. 15/622,459; 10 pages.
Extended European Search Report dated Oct. 4, 2018 for European Application No. 18176741.9; 7 Pages.
Response to Office Action filed Jun. 27, 2019 for European Application No. 18176741.9; 68 pages.
Intention of Grant dated Aug. 27, 2020 for for European Application No. 18176741.9; 2 pages.
Preliminary Amendment filed on Sep. 10, 2019 for U.S. Appl. No. 16/444,347; 9 pages.
Office Action dated Oct. 10, 2019 for U.S. Appl. No. 16/444,347; 6 pages.
Response to Office Action filed on Dec. 11, 2019 for U.S. Appl. No. 16/444,347; 10 pages.
Terminal Disclaimer filed on Dec. 10, 2019 for U.S. Appl. No. 16/444,347; 3 pages.
Notice of Allowance dated Jan. 13, 2020 for U.S. Appl. No. 16/444,347; 8 pages.
Office Action dated Mar. 8, 2019 for U.S. Appl. No. 15/697,846; 19 Pages.
Response to Office Action dated Mar. 8, 2019 filed on Jun. 6, 2019 for U.S. Appl. No. 15/697,846; 13 Pages.
Final Office Action dated Jun. 27, 2019, for U.S. Appl. No. 15/697,846; 18 pages.
Response to Final Office Action dated Jun. 27, 2019, filed Sep. 6, 2019, for U.S. Appl. No. 15/697,846; 15 pages.
Office Action dated Oct. 2, 2019 for U.S. Appl. No. 15/697,846; 20 Pages.
Response to Office Action dated Oct. 2, 2019 filed on Jan. 27, 2020 for U.S. Appl. No. 15/697,846; 14 Pages.
Final Office Action dated Apr. 14, 2020, for U.S. Appl. No. 15/697,846; 21 pages.
Extended European Search Report dated Jan. 23, 2019 for European Application No. 18192781.5; 8 Pages.
Response to Office Action filed Sep. 13, 2019 for European Application No. 18192781.5; 18 pages.
European Intension to Grant dated Jun. 22, 2020 for European Application No. 18192781.5; 6 pages.
U.S. Non-Final Office Action dated Apr. 28, 2020 for U.S. Appl. No. 16/254,874; 33 Pages.
Response to Non-Final Office Action dated Apr. 28, 2020, filed on Jul. 24, 2020 for U.S. Appl. No. 16/254,874; 22 pages.
Final Office Action dated Sep. 1, 2020 for U.S. Appl. No. 16/254,874; 5 pages.
Response to Final Office Action dated Sep. 1, 2020, filed on Oct. 20, 2020 for U.S. Appl. No. 16/254,874; 13 pages.
Notice of Allowance dated Nov. 3, 2020 for U.S. Appl. No. 16/254,874; 6 pages.
U.S. Non-Final Office Action dated May 1, 2020 for U.S. Appl. No. 16/254,869; 22 Pages.
Response to Office Action filed on Jul. 24, 2020 for U.S. Appl. No. 16/254,869; 16 pages.
Notice of Allowance dated Sep. 1, 2020 for U.S. Appl. No. 16/254,869; 6 pages.
Office Action dated Mar. 2, 2023, for U.S. Appl. No. 17/466,202; 7 pages.
Response to Office Action dated Mar. 2, 2023, filed on for U.S. Appl. No. 17/466,202; 8 pages.
Notice of Allowance dated Apr. 7, 2023 for U.S. Appl. No. 17/466,202; 9 pages.
PCT International Search Report and Written Opinion dated Sep. 19, 2022 for International Application No. PCT/US2022/033577; 13 Pages.
Restriction Requirement dated Jul. 16, 2024 for U.S. Appl. No. 17/659,224, 10 pages.
Response to Restriction Requirement dated Jul. 17, 2024, filed on Jul. 17, 2024 for U.S. Appl. No. 17/659,224, 1 page.
Extended European Search Report dated Oct. 23, 2023 for European Application No. 23177829.1-1001; 13 Pages.
Search Report and Written Opinion dated Oct. 4, 2024 for PCT Application No. PCT/US2024/034944; 15 pages.
Partial Search Report dated Nov. 29, 2024 for European Application No. 24185072.6, 14 pages.
Office Action dated Jan. 17, 2025 for U.S. Appl. No. 17/809,382, 32 pages.
Extended European Search Report dated Mar. 17, 2025 for European Application No. 24185072.6; 15 pages.
Intention to Grant dated Mar. 27, 2025 for European Application No. 23177829.1; 7 pages.
Response to U.S. Non-Final Office Action dated Aug. 29, 2024 for U.S. Appl. No. 17/659,224; Response filed on Sep. 6, 2024; 12 Pages.

* cited by examiner

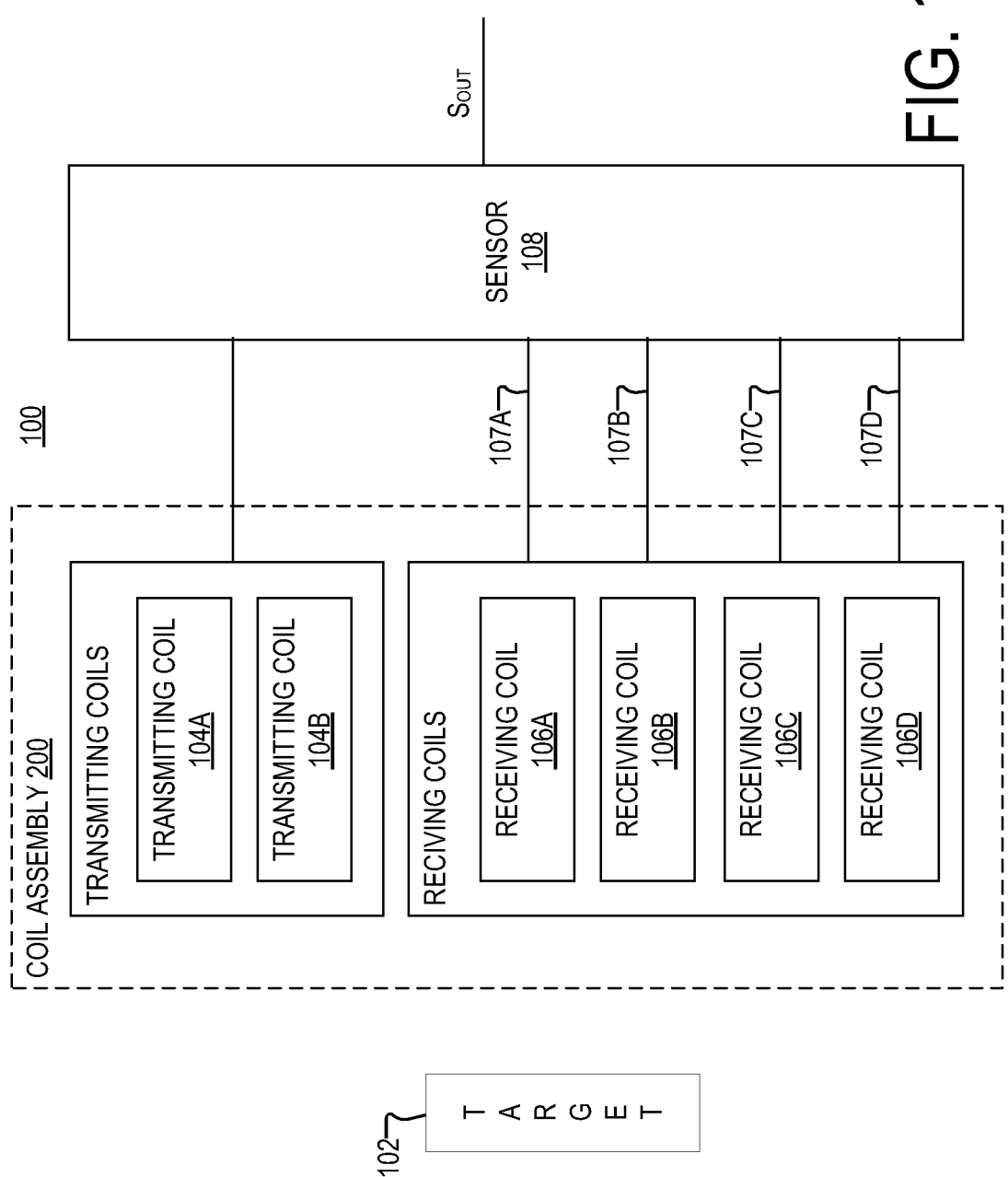

INDUCTIVE LINEAR STROKE SENSOR USING DUAL TRACKS WITH DIFFERENT PERIODICITY

BACKGROUND

As is known, sensors are used to perform various functions in a variety of applications. Some sensors include one or more electromagnetic flux sensing elements, such as a Hall effect element, a magnetoresistive element, or a receiving coil to sense an electromagnetic flux associated with proximity or motion of a target object. Sensor integrated circuits are widely used in automobile control systems and other safety-critical applications. There are a variety of specifications that set forth requirements related to permissible sensor quality levels, failure rates, and overall functional safety.

SUMMARY

According to aspects of the disclosure, a system is provided comprising: a target having a first track and a second track, the first track including one or more first features, and the second track including one or more second features, the target having a respective target length; a first receiving coil that is aligned with the first track, the first receiving coil having a first receiving coil length, the first receiving coil being configured to sense a first reflected magnetic field that is generated by any of the first features, the first receiving coil being configured to generate a first magnetic field signal in response to the first reflected magnetic field; a second receiving coil that is aligned with the first track, the second receiving coil having a second period length, the second receiving coil being configured to sense the first reflected magnetic field, the second receiving coil being configured to generate a second magnetic field signal in response to the first reflected magnetic field, the second magnetic field signal being off-phase from the first magnetic field signal; a third receiving coil that is aligned with the second track, the third receiving coil having a third period length, the third receiving coil being configured to sense a second reflected magnetic field that is generated by any of the second features, the third receiving coil being configured to generate a third magnetic field signal in response to the second reflected magnetic field; and a fourth receiving coil that is aligned with the second track, the fourth receiving coil having a fourth period length, the fourth receiving coil being configured to sense the second reflected magnetic field, the fourth receiving coil being configured to generate a fourth magnetic field signal in response to the second reflected magnetic field, the fourth magnetic field signal being off-phase from the third magnetic field signal, wherein the respective target length is less than any of the first period lengths, the second period length, the third period length, and the fourth period length, wherein, the target is spaced apart from the first receiving coil, the second receiving coil, the third receiving coil, and the fourth receiving coil, and wherein the target is configured to travel along each of the first receiving coil, the second receiving coil, the third receiving coil, and the fourth receiving coil.

According to aspects of the disclosure, a system is provided, comprising: a target having a first track and a second track, the first track including one or more first features, and the second track including one or more second features, the target having a respective target length; a first receiving coil that is aligned with the first track, the first receiving coil having a first period length, the first receiving coil being configured to sense a first reflected magnetic field that is generated by any of the first features, the first receiving coil being configured to generate a first magnetic field signal in response to the first reflected magnetic field; a second receiving coil that is aligned with the first track, the second receiving coil having a second period length, the second receiving coil being configured to sense the first reflected magnetic field, the second receiving coil being configured to generate a second magnetic field signal in response to the first reflected magnetic field, the second magnetic field signal being off-phase from the first magnetic field signal; a third receiving coil that is aligned with the second track, the third receiving coil having a third period length, the third receiving coil being configured to sense a second reflected magnetic field that is generated by any of the second features, the third receiving coil being configured to generate a third magnetic field signal in response to the second reflected magnetic field; and a fourth receiving coil that is aligned with the second track, the fourth receiving coil having a fourth period length, the fourth receiving coil being configured to sense the second reflected magnetic field, the fourth receiving coil being configured to generate a fourth magnetic field signal in response to the second reflected magnetic field, the fourth magnetic field signal being off-phase from the third magnetic field signal; and a magnetic field sensor that is configured to generate an output signal that is indicative of a position of the target, the output signal being generated based on the first magnetic field signal, the second magnetic field signal, the third magnetic field signal, and the fourth magnetic field signal, wherein the respective target length is less than any of the first period length, the second period length, the third period length, and the fourth period length, wherein, the target is spaced apart from the first receiving coil, the second receiving coil, the third receiving coil, and the fourth receiving coil, and wherein the target is configured to travel along each of the first receiving coil, the second receiving coil, the third receiving coil, and the fourth receiving coil.

BRIEF DESCRIPTION OF THE DRAWINGS

The foregoing features may be more fully understood from the following description of the drawings in which:

FIG. 1A is a diagram of an example of a system, according to aspects of the disclosure;

DETAILED DESCRIPTION

Figure 1B:
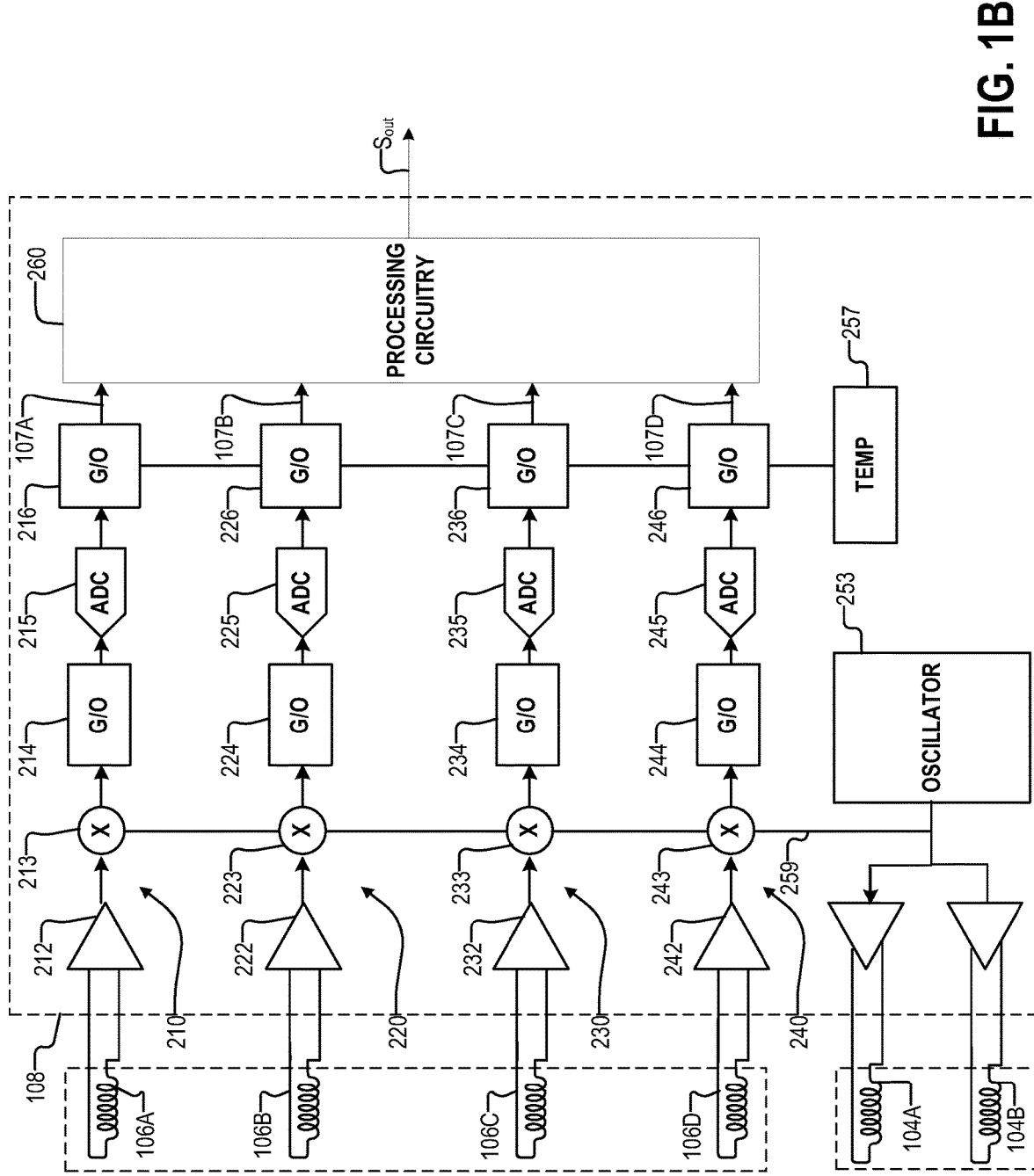
FIG. 1B is a diagram of an example of a sensor, according to aspects of the disclosure.

FIG. 1A is a diagram of an example of a system 100, according to aspects of the disclosure. The system 100 may include an integrated multi-target 102 (hereinafter "target 102"), a coil assembly 200, and an inductive sensor 108. Assembly 200 may include transmitting coils 104A and 104B and receiving coils 106A, 106B, 106C, and 106D.

Transmitting coil 104A may generate a first magnetic field. The first magnetic field may induce first eddy currents in a first set of features of target 102. The first eddy currents may result in a first reflected magnetic field being emitted from the first set of conductive features of the target 102. Receiving coils 106A and 106B may sense the first reflected field and generate magnetic field signals 107A and 107B in response to the first reflected field. The first set of features of target 102 may include one or more features 202, an example of which is shown in FIGS. 2 and 9-12. The first set of features may be part of a track 203 of target 102 (shown in FIGS. 2 and 9-12). As used herein, the term "magnetic field signal" refers to a voltage signal that is generated, at least in part, by a receiving coil in response to a magnetic field. A magnetic field signal may be a pick-up voltage signal that develops on a receiving coil, which may or may not be subsequently processed to remove error or for another reason.

Transmitting coil 104B may generate a second magnetic field. The second magnetic field may induce second eddy currents in a second set of features of target 102. The second eddy currents may result in a second reflected magnetic field being emitted from the second set of features of the target 102. The receiving coils 106C and 106D may sense the second reflected field and generate magnetic field signals 107C and 107D in response to the second reflected field. The second set of features of target 102 may include one or more features 204, an example of which is shown in FIGS. 2 and 9-12. The second set of features may be part of a track 205 of target 102 (shown in FIGS. 2 and 9-12).

In some implementations, target 102 may be coupled to mechanical element (e.g., see FIG. 13) that is configured to perform a reciprocal motion, and it may be used to measure the position of the mechanical element. The mechanical element may include a steering rack and/or any other suitable type of mechanical element that moves back and forth in a straight line (or roughly a straight line). Target 102 may be coupled to the mechanical element and arranged to move with the mechanical element. In this regard, sensor 108 may process signals 107A-D to generate a signal Sout, which is indicative of the position of target 102. As is readily apparent, the position of target 102 may then be used as a proxy for the position of the mechanical element that is coupled to the target. The position of the target may be used in various control algorithms of a controller (not shown) that controls the operation of a machine or device of which the mechanical element is part.

Although system 100 uses two different transmitting coils, wherein each transmitting coil is arranged to excite a different track in target 102, alternative implementations are possible in which one coil is used to excite both tracks (e.g., tracks 203 and 205, an example of which is shown in FIGS. 2 and 9-12).

FIG. 1B is a circuit diagram of the sensor 108, according to aspects of the disclosure. As illustrated, the sensor 108 may include signal paths 210, 220, 230, and 240, a processing circuitry 260, a temperature sensor 257, and an oscillator 253. Each of the signal paths 210-240 may be coupled to a different one of the receiving coils 106A-D. Each of the signal paths 210-240 may be configured to generate a respective one of signals 107A-D based on the magnetic field that is incident the receiving coils 106A-D.

The processing circuitry 260 may be configured to receive the signals 107A-D and generate the signal Sout based on the signals 107A-D. According to the present example, the signal Sout constitutes the output of sensor 108 and it is at least in part indicative of the position of target 102. The processing circuitry 260 may include any suitable type of electronic circuitry. By way of example, the processing circuitry 260 may include one or more of digital logic, a field-programmable gate array, a CORDIC processor, a general-purpose processor, a special-purpose processor, and/or application-specific processing circuitry.

The oscillator 253 may be configured to drive the transmitting coils with a signal 259. Although in the example of FIG. 1B the oscillator 253 is configured to drive two different transmitting coils, alternative implementations are possible in which the oscillator 253 is configured to drive only one transmitting coil or a different number of transmitting coils.

Signal path 210 may include an amplifier 212, a demodulator 213, a first gain/offset adjustment circuit 214, an analog-to-digital converter (ADC) 215, and a second gain/offset adjustment circuit 216. In operation, receiving coil 106A may generate a magnetic field signal in response to a reflected magnetic field that is produced by the first set of features of target 102. The receiving coil 106A may provide the magnetic field signal to the amplifier 212. The amplifier 212 may amplify the magnetic field signal and provide the amplified signal to the demodulator 213. The demodulator 213 may demodulate the magnetic field signal, based on the signal 259, and provide the demodulated signal to the first gain/offset adjustment circuit 214. The first gain/offset adjustment circuit 214 may adjust the gain and/or offset of the demodulated signal and provide the adjusted signal to the ADC 215. The ADC 215 may digitize the demodulated signal and provide the digitized signal to the second gain/offset adjustment circuit 216. The second gain/offset adjustment circuit 216 may adjust the gain and/or offset of the digitized signal based on a signal provided by temperature sensor 257 and generate the signal 107A as a result.

Signal path 220 may include an amplifier 222, a demodulator 223, a first gain/offset adjustment circuit 224, an analog-to-digital converter (ADC) 225, and a second gain/offset adjustment circuit 226. In operation, receiving coil 106B may generate a magnetic field signal in response to a reflected magnetic field that is produced by the first set of features of target 102. The receiving coil 106B may provide the magnetic field signal to the amplifier 222. The amplifier 222 may amplify the magnetic field signal and provide the amplified signal to the demodulator 223. The demodulator 223 may demodulate the magnetic field signal, based on the signal 259, and provide the demodulated signal to the first gain/offset adjustment circuit 224. The first gain/offset adjustment circuit 224 may adjust the gain and/or offset of the demodulated signal and provide the adjusted signal to the ADC 225. The ADC 225 may digitize the demodulated signal and provide the digitized signal to the second gain/offset adjustment circuit 226. The second gain/offset adjustment circuit 226 may adjust the gain and/or offset of the digitized signal based on a signal provided by temperature sensor 257 and generate the signal 107B as a result.

Signal path 230 may include an amplifier 232, a demodulator 233, a first gain/offset adjustment circuit 234, an analog-to-digital converter (ADC) 235, and a second gain/offset adjustment circuit 236. In operation, receiving coil 106C may generate a magnetic field signal in response to a reflected magnetic field that is produced by the second set of features of target 102. The receiving coil 106C may provide the magnetic field signal to the amplifier 232. The amplifier 232 may amplify the magnetic field signal and provide the amplified signal to the demodulator 233. The demodulator 233 may demodulate the magnetic field signal, based on the signal 259, and provide the demodulated signal to the first gain/offset adjustment circuit 234. The first gain/offset adjustment circuit 234 may adjust the gain and/or offset of the demodulated signal and provide the adjusted signal to the ADC 235. The ADC 235 may digitize the demodulated signal and provide the digitized signal to the second gain/offset adjustment circuit 236. The second gain/offset adjustment circuit 236 may adjust the gain and/or offset of the digitized signal based on a signal provided by temperature sensor 257 and generate the signal 107C as a result.

Signal path 240 may include an amplifier 242, a demodulator 243, a first gain/offset adjustment circuit 244, an analog-to-digital converter (ADC) 245, and a second gain/offset adjustment circuit 246. In operation, receiving coil 106D may generate a magnetic field signal in response to a reflected magnetic field that is produced by the set of inner features of target 102. The receiving coil 106D may provide the magnetic field signal to the amplifier 242. The amplifier 242 may amplify the magnetic field signal and provide the amplified signal to the demodulator 243. The demodulator 243 may demodulate the magnetic field signal, based on the signal 259, and provide the demodulated signal to the first gain/offset adjustment circuit 244. The first gain/offset adjustment circuit 244 may adjust the gain and/or offset of the demodulated signal and provide the adjusted signal to the ADC 245. The ADC 245 may digitize the demodulated signal and provide the digitized signal to the second gain/offset adjustment circuit 246. The second gain/offset adjustment circuit 246 may adjust the gain and/or offset of the digitized signal based on a signal provided by temperature sensor 257 and generate the signal 107D as a result.

The processing circuitry 260 may receive signals 107A-D and generate the signal Sout. As noted above, the signal Sout may be indicative of the position of target 102. In some implementations, the signal Sout may be generated in the manner discussed further below with respect to FIG. 13.

FIG. 1B is provided as an example only to illustrate one possible sensor architecture that can be used together with target 102. In this regard, it will be understood that the present disclosure is not limited to sensor 108 having any specific configuration. Although in the example of FIG. 1B each of signal paths 210-240 includes a separate ADC, alternative implementations are possible in which a single time-multiplex ADC is used for all of signal paths.

In the context of FIGS. 1A-B, signal 107A is an example of a magnetic field signal that is at least in part generated by receiving coil 106A, as is any other signal in signal path 210. Signal 107B is an example of a magnetic field signal that is at least in part generated by receiving coil 106B, as is any other signal in signal path 220. Signal 107C is an example of a magnetic field signal that is at least in part generated by receiving coil 106C, as is any other signal in signal path 230. Signal 107D is an example of a magnetic field signal that is at least in part generated by receiving coil 106D, as is any other signal in signal path 240. According to the present example, signals 107A and 107B are approximately 90 degrees off-phase from each other (e.g., because receiving coil 106A has a sinusoidal shape and receiving coil 106B has a co-sinusoidal shape). According to the present example, signals 107C and 107D are approximately 90 degrees off-phase from each other (e.g., because receiving coil 106C has a sinusoidal shape and receiving coil 106D has a co-sinusoidal shape). As used throughout the disclosure, the phrase "approximately 90 degrees off-phase" shall mean "within +/−8 degrees of being exactly 90 degrees off-phase".

Figure 2:
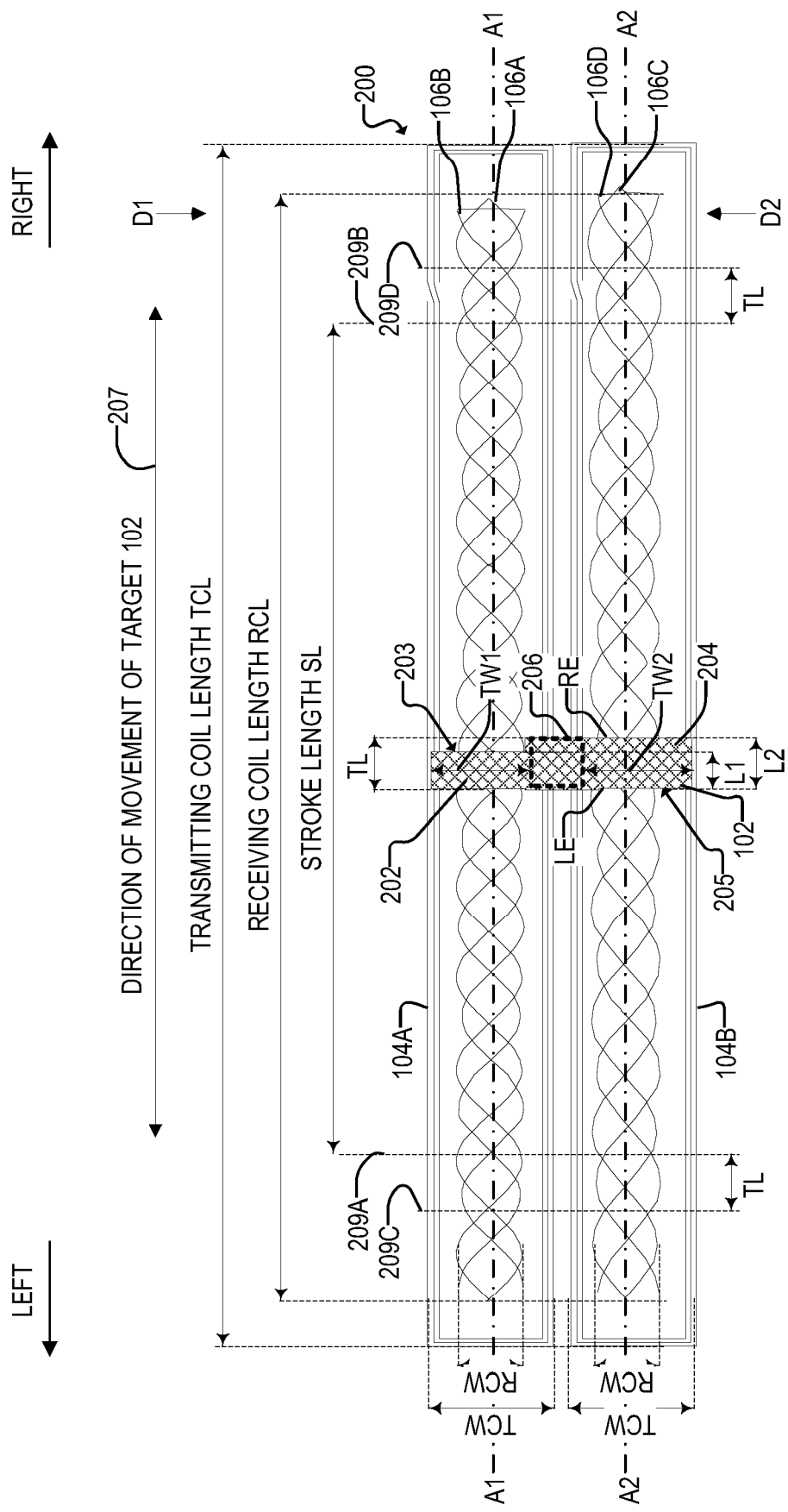
FIG. 2 is a schematic top-down view of an example of a coil assembly and target, according to aspects of the disclosure.

FIG. 2 is a diagram of coil assembly 200, according to aspects of the disclosure. In the example of FIG. 2, target 102 includes tracks 203 and 205. Track 203 includes a feature 202 and track 205 includes a feature 204. Features 202 and 204 may extend in opposite directions from a band 206. Features 202 and 204, and band 206, may be formed of metal or any other suitable type of conductive material, and they may be integral with each other. For example, in some implementations, target 102 may be formed by stamping a sheet of metal.

Although, in the present example, features 202 and 204 are coupled to each other via band 206, in some implementations, features 202 and 204 may be provided separately of each other, and band 206 may be omitted. In such implementations, features 202 and 204 may be disposed on a substrate. Although in the example of FIG. 2, track 203 includes only one feature 202, it will be understood that alternative implementations are possible in which track 203 includes a plurality of features 202. Although in the example of FIG. 2, track 205 includes only one feature 204, it will be understood that alternative implementations are possible in which track 205 includes a plurality of features 204. Although in the example of FIG. 2, tracks 203 and 205 include the same number of features, alternative implementations are possible in which one of tracks 203 and 205 includes a greater number of features than the other. Examples of alternative implementations of target 102 are discussed further below with respect to FIGS. 9-12.

Receiving coil 106B may be disposed above or below receiving coil 106A. Any of receiving coils 106A-B may be disposed above or below track 203, such that both of receiving coils 106A-B are disposed on the same side, or on opposite sides, of track 203. Receiving coil 106D may be disposed above or below receiving coil 106C, as shown. Any of receiving coils 106C-D may be disposed above or below track 205, such that both of receiving coils 106C-D are disposed on the same side, or on opposite sides, of track 205.

According to the present example, each of receiving coils 106A-D has a length RCL. Although, in the present example, all of receiving coils 106A-D have the same length, alternative implementations are possible in which any two of receiving coils 106A-D have different lengths. According to the present example, each of receiving coils 106A-D has a width RCW. Although, in the present example, all of receiving coils 106A-D have the same width, alternative implementations are possible in which any two of receiving coils 106A-D have different widths.

Transmitting coil 104A may be disposed above, below or in the same plane with any of receiving coils 106A-B. As discussed above with respect to FIGS. 1A-B, transmitting coil 104A may be aligned with track 203 and configured to excite the features in track 203 (which in the example of FIG. 2 is only one feature 202). Transmitting coil 104A may have a length TCL and a width TCW. According to the example of FIG. 2, the transmitting coil length TCL is greater than the receiving coil length RCL, and the transmitting coil width TCW is greater than the receiving coil width RCW.

Transmitting coil 104B may be disposed above, below or in the same plane with any of receiving coils 106C-D. As discussed above with respect to FIGS. 1A-B, transmitting coil 104B may be aligned with track 205 and configured to excite the features in track 205. Transmitting coil 104B may have a length TCL and a width TCW. Although in the example of FIG. 2, transmitting coils 104A-B have the same length, alternative implementations are possible in which they have different lengths. Although in the example of FIG. 2 transmitting coils 104C-D have the same width, alternative implementations are possible in which they have different widths.

Target 102 may have a length TL. As illustrated, the length TL of target 102 may be smaller (or considerably smaller) than the receiving coil length RCL and/or the transmitting coil length TCL. For example, in some implementations, the length TL may be at least five times shorter than the receiving coil length RCL. According to the example of FIG. 2, feature 202 may have a length L1 and a width TW1, and feature 204 may have a length L2 and a width TW2. According to the present example, length L2 is greater than length L1, but alternative implementations are possible in which they are equal, or in which length L1 is greater than length L2. Furthermore, alternative implementations are possible in which the length L1 is the same as the length L2. According to the present example, the widths TW1 and TW2 are the same, however, alternative implementations are possible in which they are different. According to the present example, the width TW1 of feature 202 is greater than or equal to the width RCW of receiving coils 106A-B. However, alternative implementations are possible in which the width RCW of receiving coils 106A-B is greater than the width TW1. According to the present example, the width TW1 of feature 202 is less than or equal to the width TCW of transmitting coil 104A, however, alternative implementations are possible in which the width TW1 is greater than the width TCW. According to the present example, the width TW2 of feature 204 is greater than or equal to the width RCW of receiving coils 106C-D. However, alternative implementations are possible in which the width RCW of receiving coils 106C-D is greater than the width TW2. According to the present example, the width TW2 of feature 204 is less than or equal to the width TCW of transmitting coil 104B, however, alternative implementations are possible in which the width TW2 is greater than the width TCW.

In operation, target 102 may be configured to travel along receiving coils 106A-D and transmitting coils 104A-B. Specifically, target 102 may move left and right in the direction indicated by arrow 207. Furthermore, target 102 may have a stroke length SL that is delimited by dashed lines 209A and 209B—that is, target 102 may be arranged such that the right end RE of target 102 may not travel past line 209A and the left end LE of target 102 may not travel past line 209B.

In the example of FIG. 2, the stroke length SL of target 102 is less than the length RCL of receiving coils 106A-D. According to the present disclosure, it has been determined that making the stroke length SL smaller than the receiving coil length RCL is advantageous because it reduces the amount of error that is present in the output of sensor 108. However, the present disclosure is not limited to the stroke length SL being smaller than the receiving coil length RCL. In this regard, it will be understood that alternative implementations are possible in which the receiving coil length RCL is less than or equal to the stroke length SL.

In the example of FIG. 2, the left end LE of target 102 may not travel past line 209C, which is separated from line 209A by a distance TL. Similarly, the right end RE of target 102 may not travel past line 209D that is separated from line 209B by a distance TL. Accordingly, target 102 may not travel above or below the end portions of receiving coils 106A-D, which are situated to the left of line 209C or to the right of line 209D. As is discussed further below with respect to FIG. 14, sizing receiving coils 106A-D in a way that leaves their ends aside from the end points of the trajectory of target 102 is advantageous because it reduces the amount of error that is present in the output of target 102.

In one example, receiving coils 106A-D may have periodic shapes. Specifically, as discussed above with respect to FIGS. 1A-B, receiving coils 106A-D may have sinusoidal and co-sinusoidal shapes, respectively. Under the nomenclature of the present disclosure, a portion of any of receiving coils 106A-D that is shaped as one period of the receiving coil's shape is referred to as a "period of the receiving coil". Any periods of receiving coils 106A-D that are situated to the left of line 209C and to the right of line 209D are referred to as "extra periods". The number of extra periods in receiving coils 106A-D may vary depending on the implementations. For example, each (or at least one) of receiving coils 106A-D may be provided with one extra period on each side (or on only one of its sides). As another example, each (or at least one) of receiving coils 106A-D may be provided with two extra periods on each side (or on only one of its sides). It will be understood that the present disclosure is not limited to any specific number of extra periods being provided in any receiving coils 106A-D. Furthermore, in some implementations, only a portion of a period may be provided, in any of coils 106A-D, to the left of line 209C or to the right of line 209D.

Figure 5:
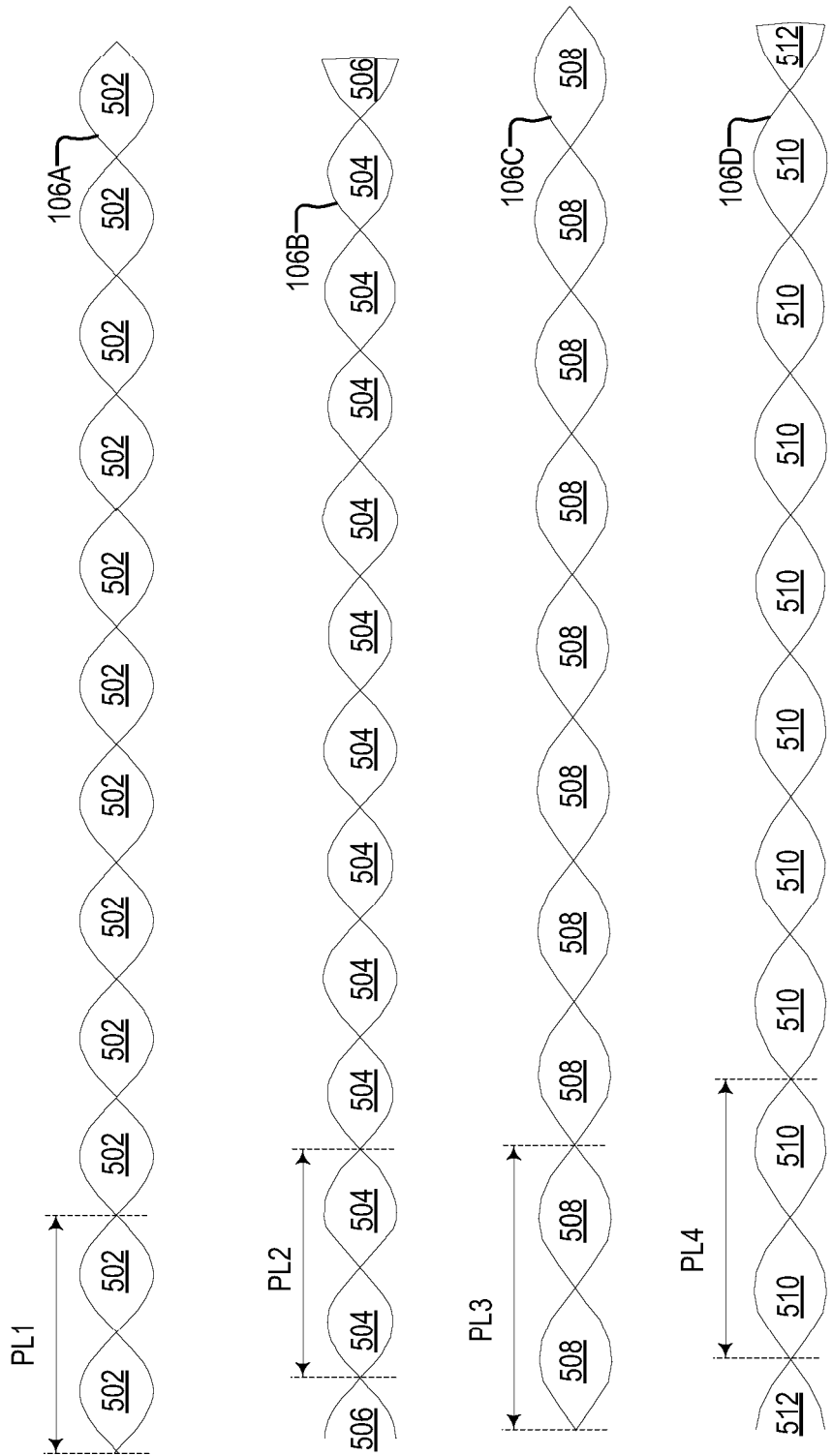
FIG. 5 is a diagram of an example of a set of receiving coils, according to aspects of the disclosure.

The periods of receiving coils 106A-D are illustrated in further detail in FIG. 5. In the example of FIG. 5, the period of receiving coil 106A has a length PL1. The period of receiving coil 106B has a length PL2. The period of receiving coil 106C has a length PL4. And the period of receiving coil 106D has a length PL4. According to the present example, the period length PL1 is equal to the period length PL2. Furthermore, according to the present example, the period length PL3 is equal to the period length PL4. And still furthermore, according to the present example, the period length PL1 is smaller than the period length PL3.

As noted above, in some implementations, no extra periods may be provided in receiving coils 106A-D. However, such implementations may result in the output of sensor 108 having a higher error than when receiving coils 106A-D are provided with extra periods. (E.G. see FIG. 14.)

In one example, receiving coils 106A-B may have an axis of symmetry A1-A1, and receiving coils 106C-D may have an axis of symmetry A2-A2. In this example, the axes of symmetry A1-A1 and A2-A2 may be substantially parallel with each other, and the trajectory of movement of target 102 may be substantially parallel to the axes of symmetry A1-A1 and A2-A2. As used throughout the disclosure, substantially parallel shall mean "within 8 degrees of being exactly parallel". Although, in the present example, the axes A1-A1 and A2-A2 are substantially parallel, it will be understood that they may be arranged at a slight angle in some applications. Furthermore, it will be understood that in some implementations, target 102 may be arranged to move at a slight angle relative to any of axes A1-A1 and A2-A2. Although in the example of FIG. 2, receiving coils 106A-D are symmetrical with respect to axes A1-A1 and A2-A2, alternative implementations are possible in which they are not symmetrical.

Although in the example of FIG. 2, the trajectory of travel of target 102 is parallel with axes A1-A1 and A2-A2, the present disclosure is not limited thereto. For example, in some implementations, target 102 may travel along any path that extends between lines 209C and 209D, which permits target 102 to be situated above or below receiving coils 102A-D. In another example, target 102 may travel along any path that permits receiving coils 106A-B to sense the magnetic field that is generated by one or more features in track 203, while also permitting receiving coils 106C-D to sense the magnetic field generated by one or more features in track 205.

According to aspects of the disclosure, making the length of target 102 shorter than the lengths of receiving coils 106A-D is advantageous because it reduces the keep-out length of target 102. The keep out-length of target 102 is equal to the sum of: (i) the stroke length SL, (ii) the distance by which the left end LE of target 102 travels past line 209A, and (iii) the distance by which the right end RE of target 102 travels past line 209B. In some respects, making the target length TL as small as possible is advantageous because it reduces its keep-out length, thus making it easier to fit target 102 in a mechanical system.

In some implementations, the target length TL may be less than or equal to the period length of any of the receiving coils 106A-D. Specifically, the target length TL is less than or equal to the period length PL1 of receiving coil 106A, the period length PL2 of receiving coil 106B, the period length PL3 of receiving coil 106C, and the period length PL4 of receiving coil 106D. Furthermore, according to the present example, it has been determined that setting the target length TL to be substantially equal one-half of each of the period lengths PL1, PL2, PL3, and PL4 is especially advantageous because it results in the strongest signal. The determination was made by simulating inductive systems while varying the target length, and analyzing the resulting envelope voltage amplitudes present on the receiving coils. A larger amplitude can be advantageous as it allows for additional air gap separation between the coils and target As used throughout the disclosure, the phrase "substantially equal to one half" shall mean within +/−10% of being exactly equal to one half.

In the example of FIG. 2, track 203 includes two receiving coils disposed over it that produce signals that are 90 degrees off-phase. However, alternative implementations are possible in which there are three receiving coils disposed over track 203, which produce signals that are 120 degrees off-phase. In the example of FIG. 2, track 205 includes two receiving coils disposed over it that produce signals that are 90 degrees off-phase. However, alternative implementations are possible in which there are three receiving coils disposed over track 205, which produce signals that are 120 degrees off-phase.

Figure 3:
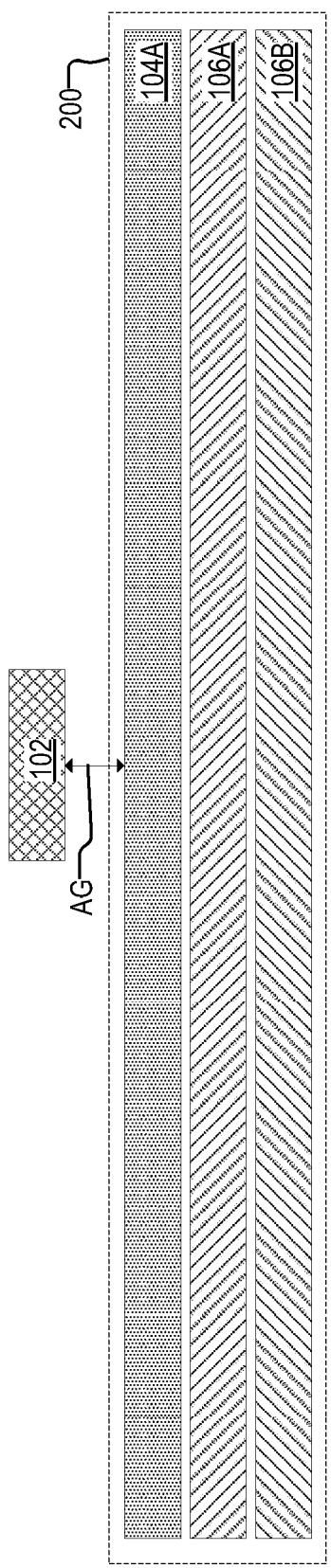
FIG. 3 is a schematic side view of the coil assembly and target of FIG. 2, according to aspects of the disclosure.
Figure 4:
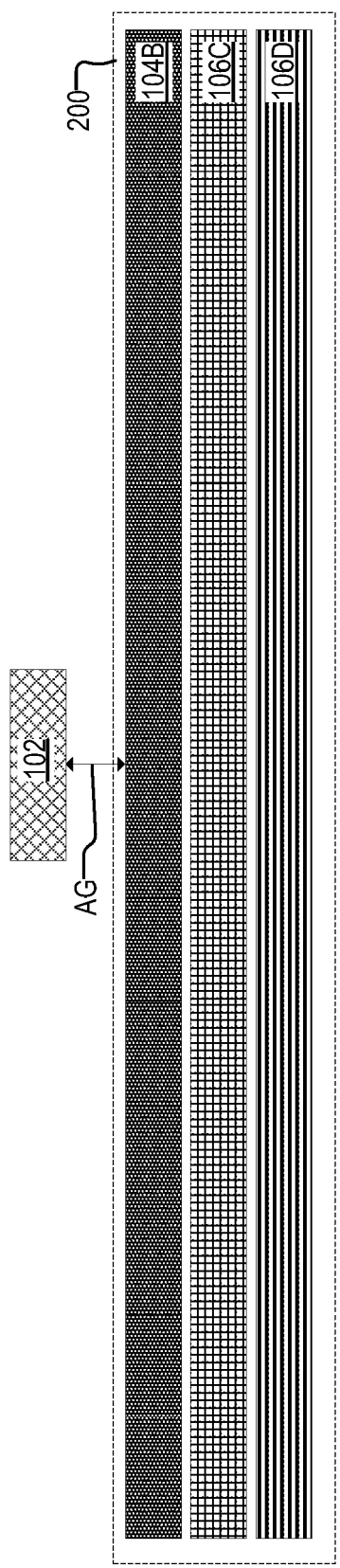
FIG. 4 is a schematic side view of the coil assembly and target of FIG. 2, according to aspects of the disclosure.

FIG. 3 is a schematic side view of system 100 when viewed from a direction D1 (shown in FIG. 2). FIG. 4 is a schematic side view of system 100 when viewed from a direction D2 (shown in FIG. 2). Together FIGS. 3-4 show that target 102 may be separated by an airgap AG from coil assembly 200. It will be understood that the present disclosure is not limited to any specific relative positioning of target 102, receiving coils 106A-B, and transmitting coil 104A. It will be further understood that the present disclosure is not limited to any specific relative positioning of target 102, receiving coils 106C-D, and transmitting coil 104B. In some implementations, receiving coils 106A-D and transmitting coils 104A-B may be implemented as different conductive traces in a printed circuit board (PCB). The conductive traces that form receiving coils 106A-D (and/or transmitting coils 104A-B) may be intertwined or arranged in any order.

FIG. 5 is a diagram showing receiving coils 106A-D in further detail, according to one example. In the example of FIG. 5, receiving coil 106A may have a sinusoidal shape, and receiving coil 106B may have a co-sinusoidal shape. A sinusoidal shape may be formed by bending a wire to define a sinusoidal waveform and then bending the sinusoidal waveform into a loop, as shown. A co-sinusoidal shape may be formed by bending a wire to define a sinusoidal waveform and then bending the sinusoidal waveform into a loop, as shown. As illustrated, receiving coil 106A may include a plurality of lobes 502. Receiving coil 106B may include a plurality a plurality of lobes 504 and half-lobes 506. Receiving coil 106C may include a plurality of lobes 508. Receiving coil 106D may include a plurality of lobes 510 and half-lobes 512. Half-lobes 506 may be the same in size and shape as one-half of lobes 504. Half-lobes 512 may be the same in size and shape as one-half of lobes 510. According to the example of FIG. 5, lobes 502 are identical in size and shape to lobes 504. However, alternative implementations are possible in which lobes 502 and 504 differ in at least one of size and shape. According to the example of FIG. 5, lobes 508 are identical in size and shape to lobes 510. However, alternative implementations are possible in which lobes 508 and 510 differ in at least one of size and shape. Although in the example of FIG. 5, lobes 506 are half-lobes that are the same in size and shape to one half of lobes 504, in alternative implementations, each of lobes 506 may be the same in shape and size to a different fraction of lobes 504. For example, in such implementations, each of lobes 506 may be the same in shape and size as one-third of a lobe 504.

Figure 6:
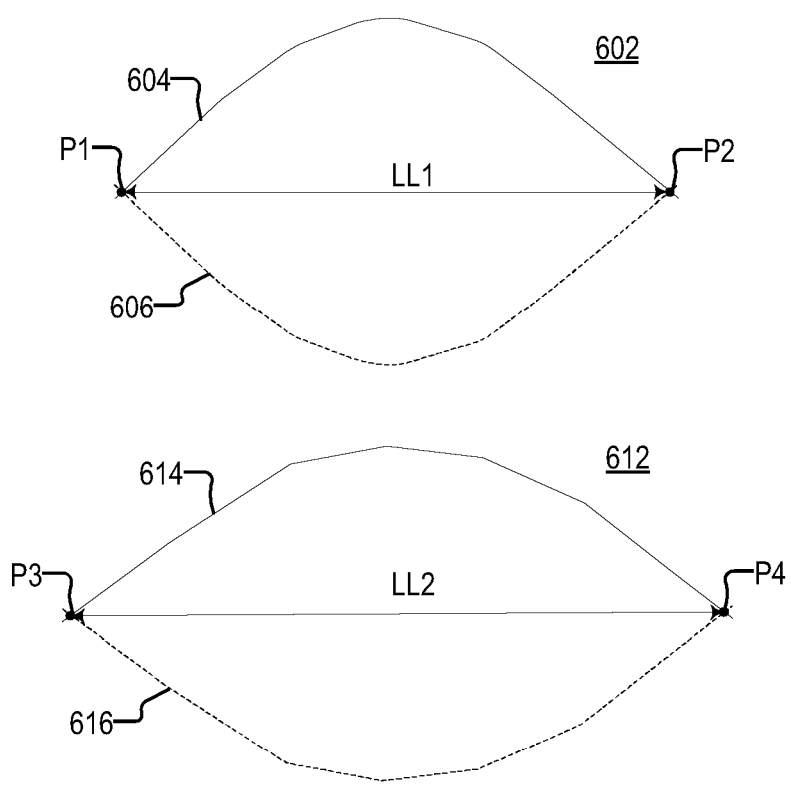
FIG. 6 is a diagram of an example of a set of receiving coil lobes, according to aspects of the disclosure.

FIG. 6 is a diagram of an example of lobes 602 and 612, according to aspects of the disclosure. Lobe 602 may be identical to each of lobes 504. Lobe 602 may be identical to each of lobes 502, except for lobes 502 that are situated at the very ends of receiving coil 106A. Lobe 602 may include segments 604 and 606. Each of segments 604 and 606 may be a different segment of wire or conductive trace. Segments 604 and 606 overlap at points P1 and P2. At each of points P1 and P2, segment 604 runs above or below segment 606, without coming into electrical contact with segment 606. In other words, segments 604 and 606 are electrically isolated from each other at points P1 and P2. The length LL1 of lobe 602 is defined the distance between points P1 and P2. Lobe 612 may be identical to each of lobes 510. Lobe 612 may be identical to each of lobes 508, except for the lobes 508 that are situated at the very ends of receiving coil 106C. Lobe 612 may include segments 614 and 616. Each of segments 614 and 616 may be a different segment of wire or conductive trace. Segments 614 and 616 overlap at points P3 and P4. At each of points P3 and P4, segment 614 runs above or below segment 616, without coming into electrical contact with segment 616. In other words, segments 614 and 616 are electrically isolated from each other at points P3 and P4. The length LL2 of lobe 612 is defined as the distance between points P3 and P4, and it is greater that the length LL1.

In one respect, FIG. 6 is provided to illustrate that the lobes in receiving coils 106C-D may have a greater width (or otherwise have a larger size) than the lobes in receiving coils 106A-B. In other words, the sinusoidal waveform defined by the shape of receiving coil 106A may have a smaller period than the sinusoidal waveform defined by the shape of receiving coil 106C. In some implementations, the co-sinusoidal waveform defined by the shape of receiving coil 106B may have a smaller period than the co-sinusoidal waveform defined by the shape of receiving coil 106D.

Figure 7:
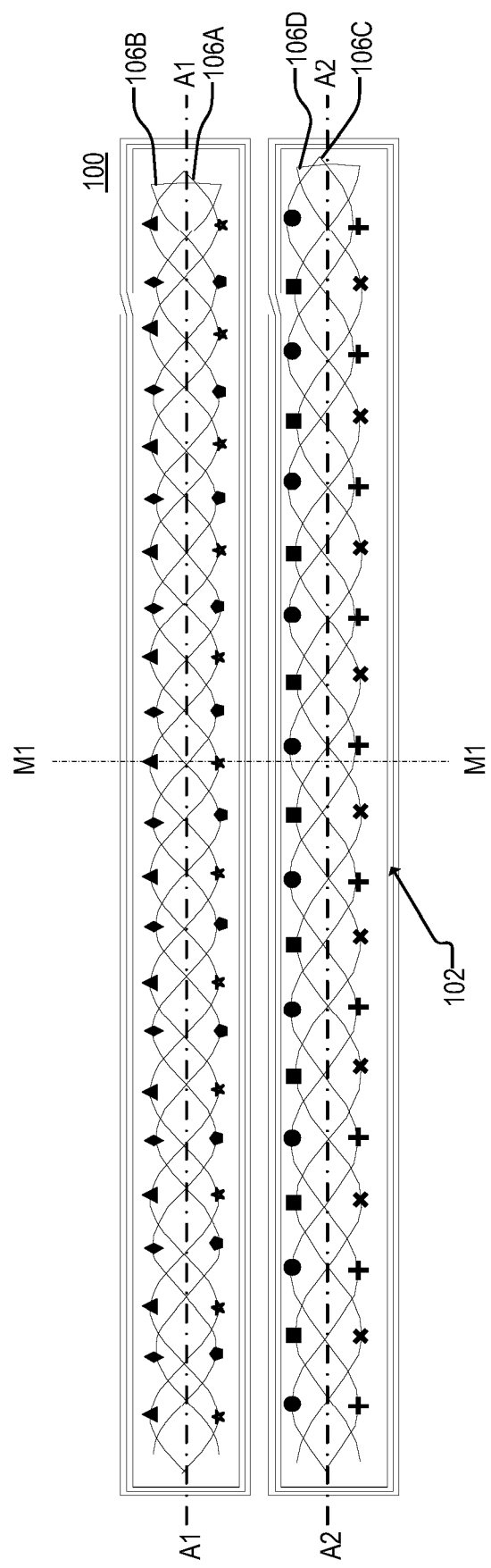
FIG. 7 is a diagram of an example of a set of receiving coils, according to aspects of the disclosure.

FIG. 7 is a diagram of coil assembly 200, according to aspects of the disclosure. FIG. 7 is provided to illustrate the respective positioning of the vertices in receiving coils 106A-B relative to the vertices of receiving coils 106C-D. In one aspect, FIG. 7 is provided to illustrate that, the vertices of receiving coil 106C may be offset from the vertices in receiving coils 106A-B. In another aspect, FIG. 7 is provided to illustrate that the vertices in receiving coil 106D may also be offset from the vertices in receiving coils 106A-B.

In the example of FIG. 7, receiving coil 106A may include a plurality of upper vertices and a plurality of lower vertices. In FIG. 7, the upper vertices in receiving coil 106A are marked by triangles, and the lower vertices are marked by stars. Receiving coil 106B may include a plurality of upper vertices and a plurality of lower vertices. In FIG. 7, the upper vertices in receiving coil 106B are marked by diamonds, and the lower vertices are marked by pentagons. Receiving coil 106C may include a plurality of upper vertices and a plurality of lower vertices. In FIG. 7, the upper vertices in receiving coil 106C are marked by circles, and the lower vertices are marked by crosses. In the example of FIG. 7, receiving coil 106D may include a plurality of upper vertices and a plurality of lower vertices. In FIG. 7, the upper vertices in receiving coil 106D are marked by squares, and the lower vertices are marked by X-shapes.

Also shown in FIG. 7, is a line M1-M1 that is perpendicular to the axes of symmetry A1-A1 and A2-A2 (discussed above with respect to FIG. 2). As illustrated in FIG. 7, one of the upper vertices and one of the lower vertices in receiving coil 106A lie on line M1-M1, while none of the vertices in receiving coils 106C-D lie on line M1-M1. This is because the vertices in receiving coils 106C-D are offset from the vertices. Under the nomenclature of the present disclosure, one vertex is not offset from the other when both vertices lie on a line that is perpendicular to the axes of symmetry (or another reference line, such as a line describing the trajectory of travel of target 102).

In the present example, the vertices in receiving coils 106A-B are offset, along axes A1-A1 and A2-A2, from the vertices in receiving coils 106C-D. Moreover, in the present example, the axes A1-A1 and A2-A2 are parallel with the path that is traveled back and forth by target 102 (i.e., the trajectory of movement of target 102). However, in instances in which the path traveled target 102 is not parallel with axes A1-A1 and/or A2-A2, the vertices in receiving coils 106A-B may be offset from the vertices in receiving coils 106C-D along the path of travel, rather than being offset along the axes A1-A1 and/or A2-A2.

Figure 8:
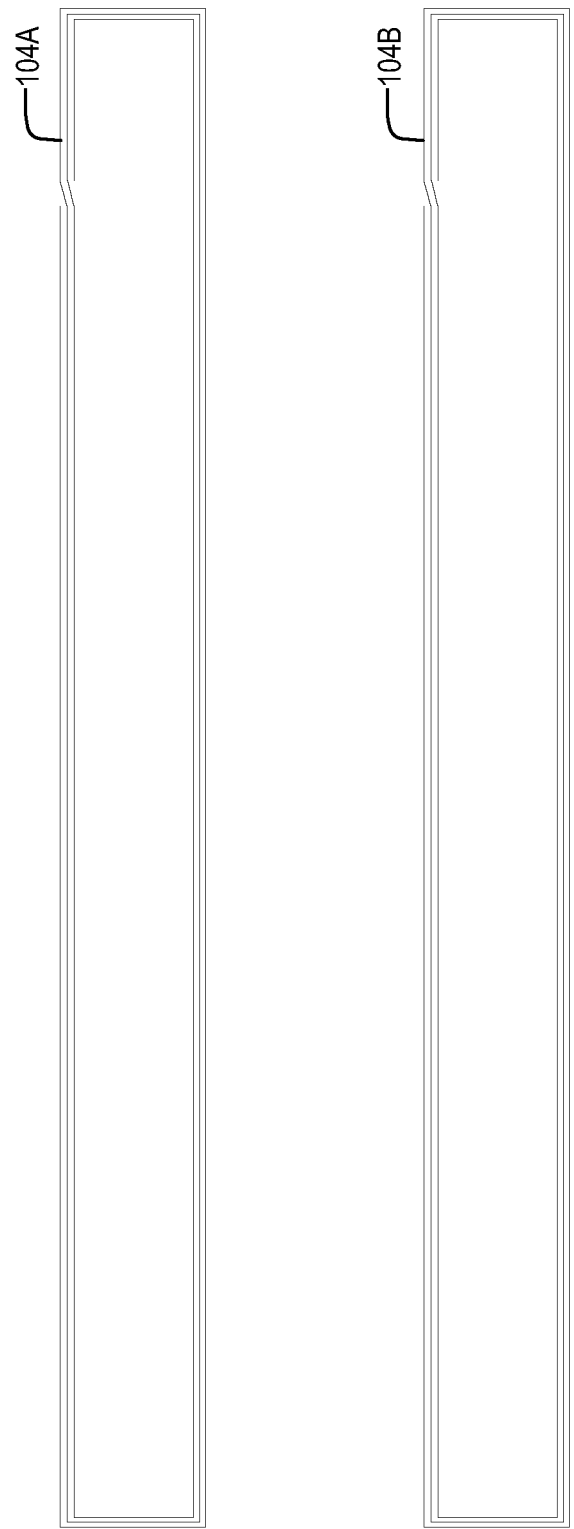
FIG. 8 is a diagram of an example of a set of transmitting coils, according to aspects of the disclosure.

FIG. 8 is a diagram illustrating transmitting coils 104A-B. FIG. 8 is provided to illustrate that each of receiving coils is 104A-B may include one or more turns of wire or conductive trace. It will be understood that the present disclosure is not limited to any specific implementation of transmitting coils 104A-B.

Figure 9:
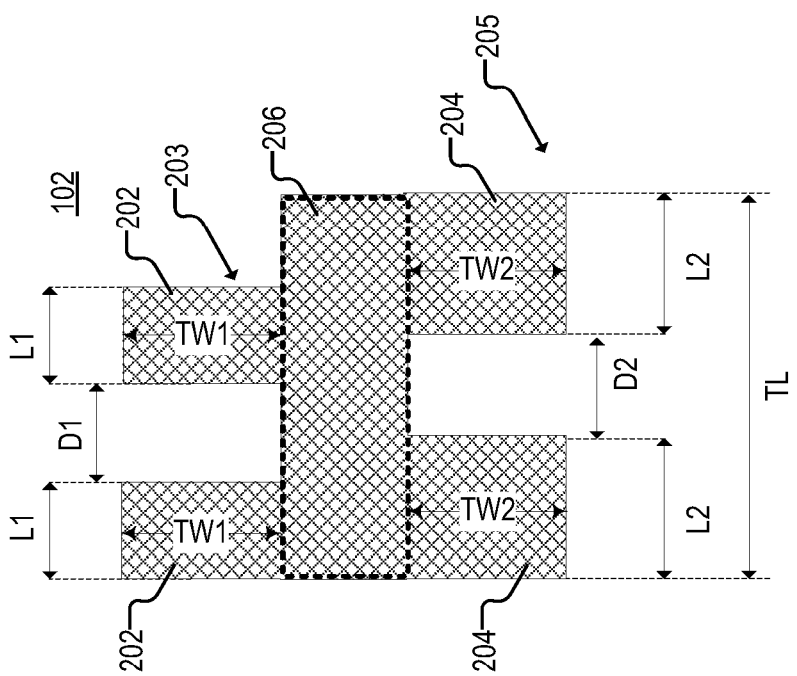
FIG. 9 is a diagram of an example of a target, according to aspects of the disclosure.

FIG. 9 shows an example of another implementation of target 102. In the example of FIG. 9, track 203 of target 102 includes two features 202, and track 205 also includes two features 204. Each of features 202 has a length L1 and each of features 204 has a length L2. Features 202 are separated from each other by a distance D1. Features 204 are separated from each other by a distance D2, which is greater than distance D1. Features 202 and 204 extend in opposite directions from band 206. Features 202 and 204 may be formed of any conductive material. In one example, features 202 and 204 are formed of metal. In one example, target 102 is formed by stamping a sheet of metal. In this example, features 202, 204, and band 206 may be integral with each other. Although in the example of FIG. 9, all features 202 have the same length, alternative implementations are possible in which the features 202 in track 203 have different lengths. Although in the example of FIG. 9, all features 204 have the same length, alternative implementations are possible in which the features 204 in track 203 have different lengths. Although in the example of FIG. 9, distance D1 is smaller than distance D2, alternative implementations are possible in which distance D1 is greater than or equal to distance D2. Additionally or alternatively, in some implementations, the sum of the length L1 and the distance D1 may be smaller than the sum of the length L2 and the distance D2 (i.e., L1+D1<L2+D2).

Figure 10:
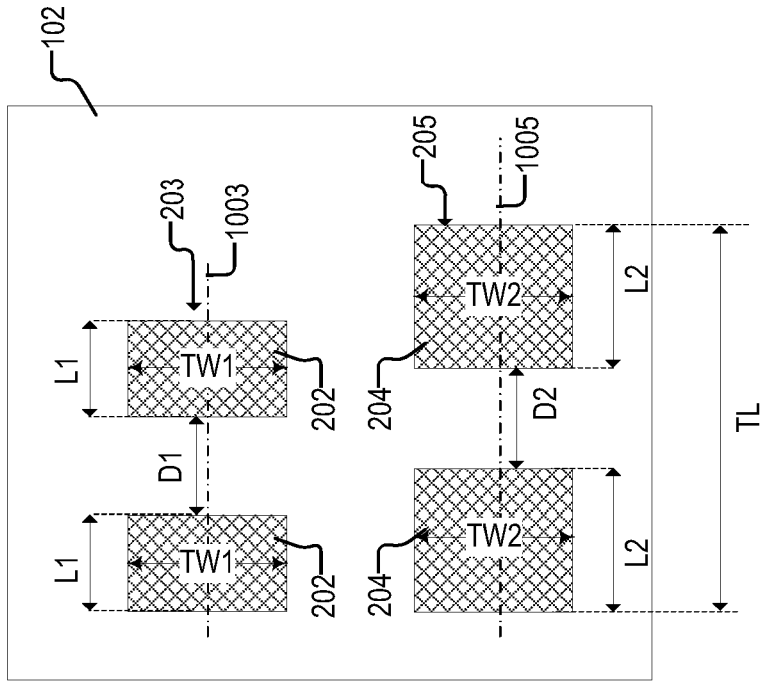
FIG. 10 is a diagram of an example of a target, according to aspects of the disclosure.

FIG. 10 is a diagram of another implementation of target 102, according to aspects of the disclosure. The implementation that is shown in FIG. 10 is identical to the implementation of target 102 that is presented in FIG. 9, but for the band 206 being omitted. In other words, in the example of FIG. 10, features 202 are formed separately from each other, and features 204 are also formed separately from each other. Specifically, features 202 and 204 may be formed on a substrate 1002, as shown. In some implementations, features 202 may be centered on a line 1003, and features 204 may be centered on a line 1005 which is parallel to line 1003. Substrate 1002 may be formed of epoxy resin, plastic, and/or any other suitable material. In some implementations, features 202 and 204 may be etched out of a metal layer that is provided on substrate 1002. Alternatively, features 202 and 204 may be glued or otherwise adhered to substrate 1002. In one respect, FIG. 10 is provided to illustrate that the features 202 and 204 need not be integral with each other and they may be formed separately from each other.

Figure 11:
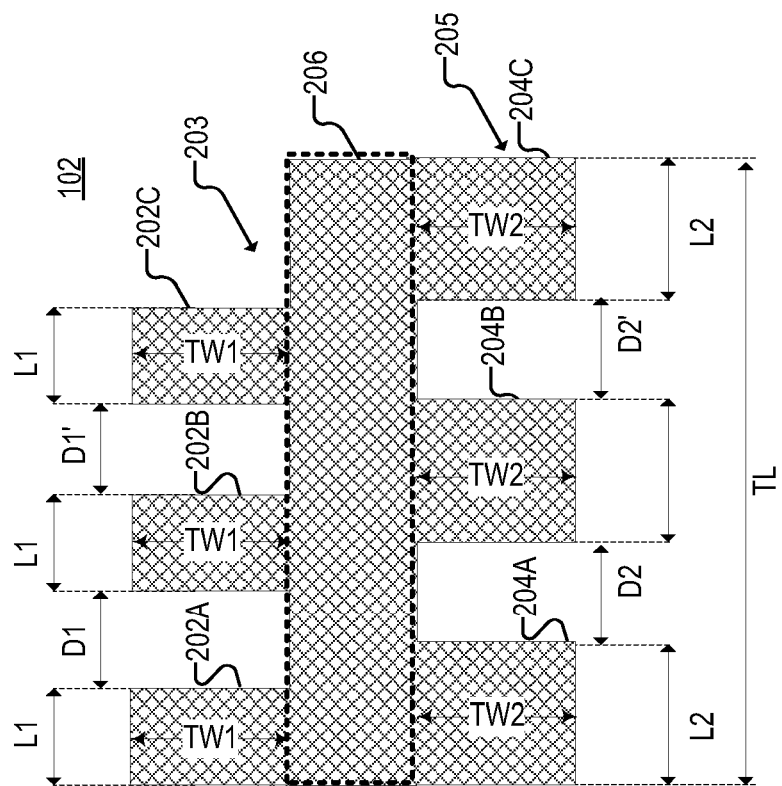
FIG. 11 is a diagram of an example of a target, according to aspects of the disclosure.

FIG. 11 shows an example of another implementation of target 102. In the example of FIG. 11, track 203 of target 102 includes three features 202, which are enumerated as features 202A, 202B, and 202C, respectively. Track 205 also includes three features 204, which are enumerated as features 204A, 204B, and 204C, respectively. Each of features 202A-C has a length L1 and each of features 204A-C has a length L2. Features 202A and 202B are separated from each other by a distance D1 and features 202B and 202C are separated from each other by a distance D1'. Features 204A and 204B are separated from each other by a distance D2 and features 204B and 204C are separated from each other by a distance D2'. Features 202 and 204 extend in opposite directions from band 206. Features 202 and 204 may be formed of any conductive material. In one example, features 202 and 204 are formed of metal. In one example, target 102 is formed by stamping a sheet of metal. In this example, features 202, 204, and band 206 may be integral with each other.

Although in the example of FIG. 11, all features 202 have the same length, alternative implementations are possible in which at least two of the features 202 in track 203 have different lengths. Although in the example of FIG. 11, all features 204 have the same length, alternative implementations are possible in which at least two of the features 204 in track 205 have different lengths. Although in the example of FIG. 11, distance D1 is smaller than distance D2, alternative implementations are possible in which distance D1 is greater than or equal to distance D2. Although in the example of FIG. 11, distances D1 and D1' are equal, alternative implementations are possible in which they are different. Although in the example of FIG. 11, distances D2 and D2' are equal, alternative implementations are possible in which they are different. According to the example of FIG. 11, the length L1 is smaller than the distance D1, however, alternative implementations are possible in which the length L1 is greater than or equal to the distance D1. According to the example of FIG. 11, the length L2 is smaller than the distance D2, however, alternative implementations are possible in which the length L2 is greater than or equal to the distance D1.

Figure 15:
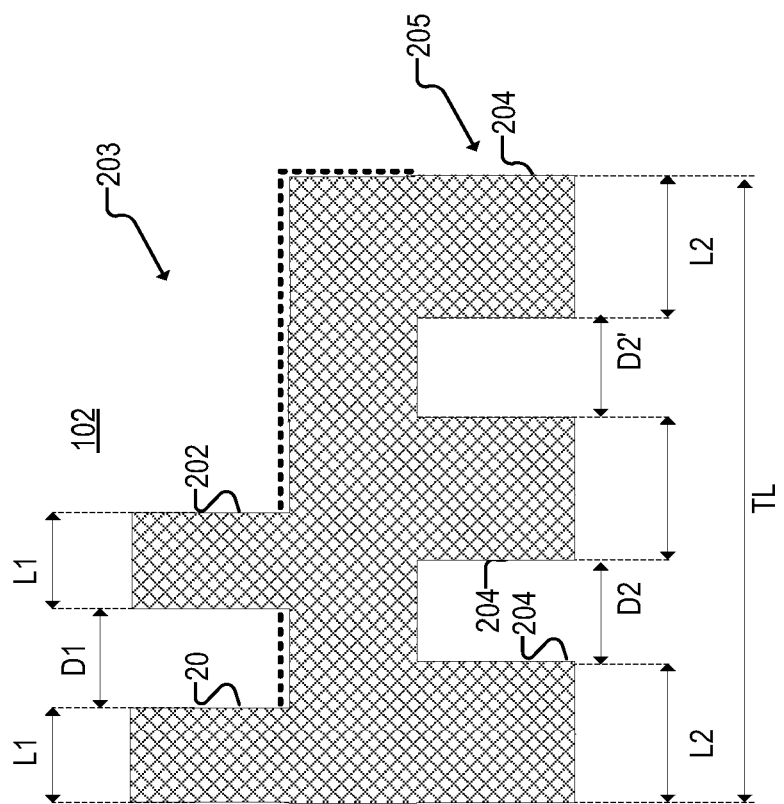
FIG. 15 is a diagram of an example of a target, according to aspects of the disclosure.

Although in the example of FIG. 11 tracks 203 and 205 include the same number of features, alternative implementations are possible in which they include a different number of features. For instance, as illustrated in FIG. 15, track 203 may include 2 features 202, and track 205 may include a total of 3 features. According to the present disclosure, it has been determined that having one of tracks in target 102 include N features and having the other target include N+1 features results in the greatest phase separation between the electrical angles θ1 and θ2, which are discussed further below with respect to equations 1 and 2. According to the present example, N is a positive integer greater than or equal to 1. The phase separation when one of the tracks has N features and the other one has N+1 features has been determined to be better than instances when the two tracks include the same number of features or when one of the tracks includes more than one feature in excess of the features that are available in the other track. The determination was made by modeling different feature ratios in Microsoft Excel, considering the usable sensing range that provides unambiguous position information, and considering the data separation between different points along the tracks.

Figure 12:
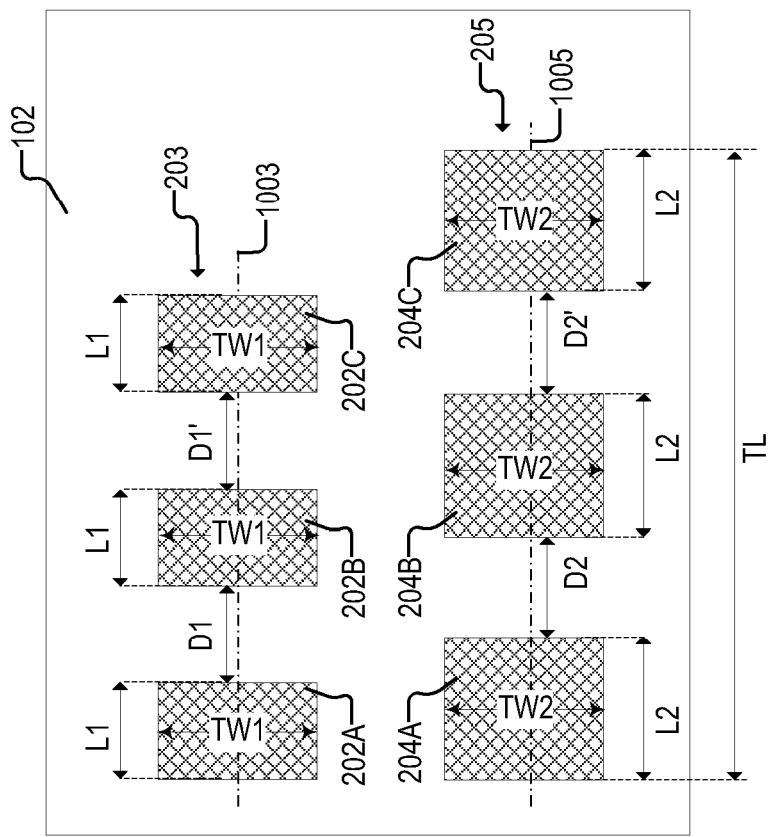
FIG. 12 is a diagram of an example of a target, according to aspects of the disclosure.

FIG. 12 is a diagram of another implementation of target 102, according to aspects of the disclosure. The implementation that is shown in FIG. 12 is identical to the implementation of target 102 that is shown in FIG. 11, but for the band 206 being omitted. In other words, in the example of FIG. 12, features 202A-C are formed separately of each other, and features 204A-C are also formed separately of each other. Specifically, features 202A-C and 204 may be formed on a substrate 1002, as shown. In some implementations, features 202A-C may be centered on a line 1003, and features 204A-C may be centered on a line 1005 which is parallel to line 1003. Substrate 1002 may be formed of epoxy resin, plastic, and/or any other suitable material. In some implementations, features 202 and 204 may be etched out of a metal layer that is provided on substrate 1002. Alternatively, features 202 and 204 may be glued or otherwise adhered to substrate 1002. In one respect, FIG. 12 is provided to illustrate that the features 202A-C and 204A-C need not be integral with each other and they may be formed separately of each other.

In the examples of FIGS. 9-12, the features 202 in track 203 have a width TW1 and the features 204 in band 205 have a track TW2. Although in the examples of FIGS. 9-12 the features in each of tracks 203 and 205 have the same width, it will be understood that alternative implementations are possible in which at least two features in any of tracks 203 and 205 have different widths.

Figure 13:
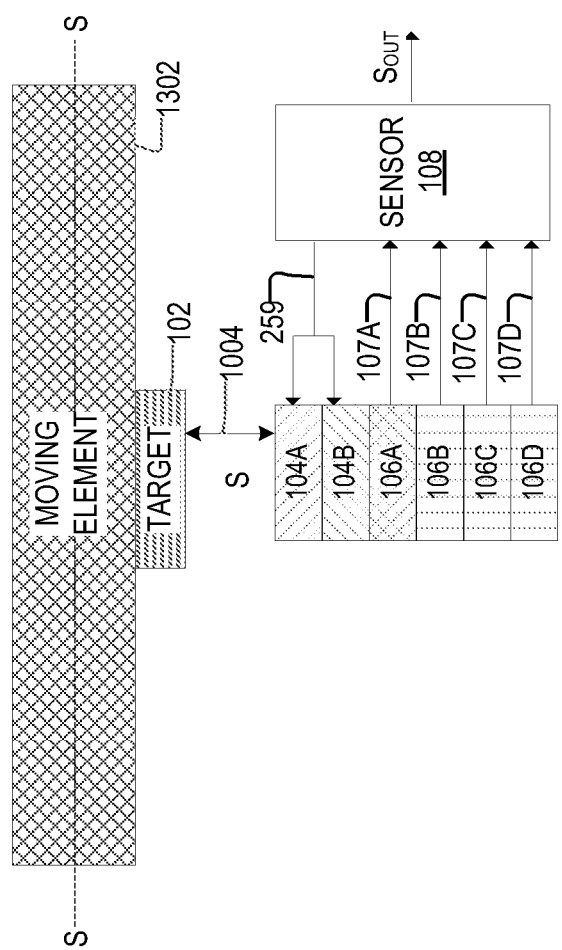
FIG. 13 is a diagram of an example of a system, according to aspects of the disclosure.

FIG. 13 is a schematic diagram illustrating an example of one possible use of target 102. As illustrated, target 102 may be mounted on a shifting element 1302 (e.g., a steering rack, etc.). Shifting element 1302 may be actuated manually or by an electrical motor (not shown), or any other type of actuator. Shifting element 1302 may be arranged to move back and forth along a line S-S. According to the present example, target 102 moves along line S-S. Transmitting coils 104A-B and receiving coils 106A-D may be spaced apart from target 102 by air gap AG. Transmitting coils 104A-D and receiving coils 106A-D may be coupled to sensor 108. Sensor 108 may drive transmitting coils 104A-B with signal 259, which is discussed above with respect to FIG. 1B. Sensor 108 may receive, from receiving coils 106A-D, signals 107A-D, which are discussed above with respect to FIGS. 1A-B.

Sensor 108 may use the Vernier principle to determine the angular position of target 102. The Vernier principle provides that each pair of electrical angles θ1 and θ2 of a target corresponds to a different angular position of the target. In the present example, sensor 108 may determine the electrical angles θ1 and θ2 of target 102, where θ1 is the electrical angle of track 203, and θ2 is the electrical angle of track 205. Afterward, sensor 108 may map the pair (θ1, θ2) to a corresponding value of the position of target 102.

Electrical angles θ1 and θ2 may be determined in accordance with equations 1 and 2 below:

$$\theta 1 = \arctan\left(\frac{val_{107A}}{val_{107B}}\right) \quad (1)$$

$$\theta 2 = \arctan\left(\frac{val_{107C}}{val_{107D}}\right) \quad (2)$$

Where $val^{107A}$ is the value of signal 107A, $val^{107B}$ is the value of signal 107B, $val_{107C}$ is the value of signal 107C, and $val_{107D}$ is the value of signal 107D. The application of the Vernier principle is discussed in further detail in U.S. patent application Ser. No. 17/809,382 entitled POSITION SENSING METHOD, filed on Jun. 28, 2022, which is hereby incorporated herein by reference in its entirety. Furthermore, the application of the Vernier principle is discussed in further detail in U.S. patent application Ser. No. 18/393,954, titled POSITION SENSING METHOD AND SYSTEM, and client reference number A-2963, which is filed on Dec. 22, 2023, and which is hereby incorporated herein by reference in its entirety. The latter application provides an example of a mathematical model that uses the Vernier principle to determine the position of a rotating target based on electrical angles that are associated with the target.

Alternatively, in some implementations, a look-up table can be used instead of performing calculations. The table may be stored in a built-in memory of sensor 108 (not shown). The table could have a plurality of entries (e.g., rows). Each entry may include a respective value of a first electrical angle (e.g., θ1), a respective value of a second electrical angle (e.g., θ2), and an indication of a position of target 102 that corresponds to the respective values of the first and second electrical angles. The position of the target may be determined by performing a search of the table based on the electrical angle values.

Throughout the disclosure, coil assemblies are provided that include multiple receiving and/or transmitting coils. In these assemblies, the receiving/transmitting coils are stacked. It will be understood that in any of the assemblies, the receiving/transmitting coils may be arranged in any order within the stack. Furthermore, it will be understood that one or more of the coils can be interweaved. When two coils are interweaved, a first portion of a first coil may be disposed above a second portion of a second coil and a third portion of the first coil may be disposed below a fourth portion of the second coil.

Figure 14:
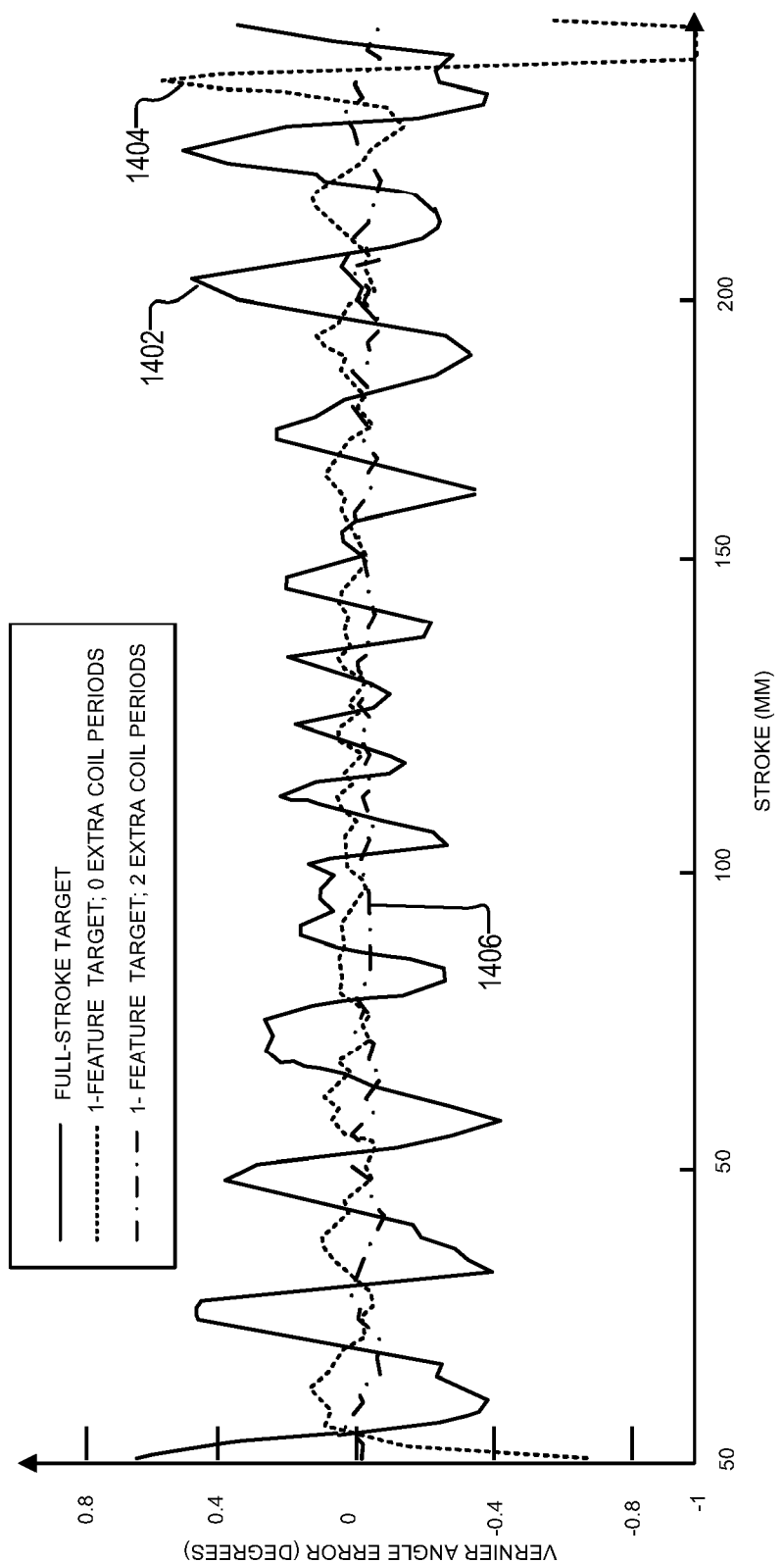
FIG. 14 is a graph that compares the performance of different receiving coil and target designs, according to aspects of the disclosure.

FIG. 14 is a graph illustrating the performance of different target designs when they are used together with sensor 108. Specifically, FIG. 14 shows curves 1402, 1404, and 1406 which represent the error in the output of sensor 108. Curve 1402 shows the error in the output of sensor 108, when sensor 108 is used to estimate the position of a target having a full-stroke design. The full-stroke target design may be the same as the design shown in FIG. 11, except for that it may have a greater target length and a larger number of features 202 and 204. Specifically, the full-stroke target design has a target length TL that is equal to the stroke length SL (shown in FIG. 2). The full-stroke target design includes a plurality of features in track 203 that each have a length L1 and are spaced art by a distance D1 (shown in FIG. 11). Furthermore, the full-stroke target design includes a plurality of features in track 205 that each have a length L2 and are spaced apart by a distance D2 (shown in FIG. 11). Curves 1404 and 1406 shows the error in the output of sensor 108 when sensor 108 is used to estimate the position of a target having a single-feature design. The single-feature target design is the same as the design of target 102 that is shown in FIG. 1. Specifically, curve 1404 shows the error in the output of sensor 108 when no extra periods are provided in each of receiving coils 106A-D. Curve 1406 shows the error in the output of sensor 108 when two extra periods are provided on each end of each of receiving coils 106A-D. Together, curves 1402, 1404, and 1406 illustrate that, according to the present disclosure, it has been determined that: (i) using a full-stroke target designs results in a higher error than when target designs of length shorter than the stroke length are used, and (ii) the provision of extra periods at the ends of receiving coils 106A-D results in error reduction. Although not shown in FIG. 14, according to the present disclosure, it has been determined that providing two extra periods at each end of each of receiving coils 106A-D results in a greater error reduction (across the entire stroke of the target) than when only one extra period is provided at each end of each of receiving coils 106A-D. The receiving and transmitting coil designs that are used to generate curves 1402-1406 are the same or similar to designs of receiving coils 106A-D and transmitting coils 104A-B, which are discussed above with respect to FIGS. 1A-13.

The concepts and ideas described herein may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high-level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, or volatile memory. The term unit (e.g., an addition unit, a multiplication unit, etc.), as used throughout the disclosure may refer to hardware (e.g., an electronic circuit) that is configured to perform a function (e.g., addition or multiplication, etc.), software that is executed by at least one processor, and configured to perform the function, or a combination of hardware and software.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

The invention claimed is:

1. A system comprising:
 a target having a first track and a second track, the first track including one or more first features, and the second track including one or more second features, the target having a respective target length;
 a first receiving coil that is aligned with the first track, the first receiving coil having a first period length, the first receiving coil being configured to sense a first reflected magnetic field that is generated by any of the first features, the first receiving coil being configured to generate a first magnetic field signal in response to the first reflected magnetic field;
 a second receiving coil that is aligned with the first track, the second receiving coil having a second period length, the second receiving coil being configured to sense the first reflected magnetic field, the second receiving coil being configured to generate a second magnetic field signal in response to the first reflected magnetic field, the second magnetic field signal being off-phase from the first magnetic field signal;
 a third receiving coil that is aligned with the second track, the third receiving coil having a third period length, the third receiving coil being configured to sense a second reflected magnetic field that is generated by any of the second features, the third receiving coil being configured to generate a third magnetic field signal in response to the second reflected magnetic field; and
 a fourth receiving coil that is aligned with the second track, the fourth receiving coil having a fourth period length, the fourth receiving coil being configured to sense the second reflected magnetic field, the fourth receiving coil being configured to generate a fourth magnetic field signal in response to the second reflected magnetic field, the fourth magnetic field signal being off-phase from the third magnetic field signal,
 wherein the respective target length is less than any of the first period length, the second period length, the third period length, and the fourth period length, wherein, the target is spaced apart from the first receiving coil, the second receiving coil, the third receiving coil, and the fourth receiving coil, and wherein the target is configured to travel along each of the first receiving coil, the second receiving coil, the third receiving coil, and the fourth receiving coil.

2. The system of claim 1, wherein the respective target length is substantially equal to one half of any of the first period length, the second period length, the third period length, and the fourth period length.

3. The system of claim 1, wherein:

the first receiving coil includes a plurality of first lobes;

the second receiving coil includes a plurality of second lobes;

the third receiving coil includes a plurality of third lobes, any of the plurality of third lobes having a larger size than any of the plurality of first lobes and any of the plurality of second lobes, and the fourth receiving coil includes a plurality of fourth lobes, any of the plurality of fourth lobes having a larger size than any of the plurality of first lobes and any of the plurality of second lobes.

4. The system of claim 1, wherein:

the first receiving coil includes a plurality of first lobes;

the second receiving coil includes a plurality of second lobes;

the third receiving coil includes a plurality of third lobes, each of the plurality of third lobes being offset, along a path of travel of the target, from each of the plurality of first lobes and each of the plurality of second lobes, and the fourth receiving coil includes a plurality of fourth lobes, each of the plurality of fourth lobes being offset, along the path of travel of the target, from each of the plurality of first lobes and each of the plurality of second lobes.

5. The system of claim 1, wherein:

the first receiving coil includes a first end portion, a second end portion, and a middle portion that is disposed between the first end portion and the second end portion;

the target is configured to travel over the middle portion only, such that the target is configured to stay aside from the first end portion and the second end portion.

6. The system of claim 1, wherein the first track includes N first features and the second track includes N+1 features, wherein N is a positive integer greater than or equal to 1.

7. The system of claim 1, wherein each of the one or more first features has a smaller size than any of the one or more second features.

8. The system of claim 1, wherein the first receiving coil has a periodic shape, and the target is configured to travel above or below each of a plurality of periods of the first receiving coil, except for one or more periods that are situated in a first end of the first receiving coil and one or more periods that are situated in a second end of the first receiving coil.

9. The system of claim 1, further comprising a first transmitting coil and a second transmitting coil, wherein the first reflected magnetic field is transmitted in response to a first excitation magnetic field that is produced by the first transmitting coil and the second reflected magnetic field is generated in response to a second excitation magnetic field that is produced by the second transmitting coil.

10. The system of claim 1, further comprising a magnetic field sensor that is configured to generate an output signal based on the first magnetic field signal, the second magnetic field signal, the third magnetic field signal, and the fourth magnetic field signal, the output signal being indicative of a position of the target.

11. The system of claim 1, wherein the first track includes only one first feature and the second track includes only one second feature.

12. The system of claim 1, wherein the first track includes a plurality of first features and the second track includes a plurality of second features.

13. The system of claim 1, wherein the target includes a band that is integral with the one or more first features and the one or more second features, the one or more first features and the one or more second features extending in opposite directions from the band.

14. The system of claim 1, wherein the target includes a substrate, wherein the one or more first features and the one or more second features are disposed over the substrate.

15. The system of claim 1, wherein the first receiving coil, the second receiving coil, the third receiving coil, and the fourth receiving coil are implemented as conductive traces that are part of a printed circuit board.

16. The system of claim 1, wherein the first receiving coil has a sinusoidal shape, the second receiving coil has a co-sinusoidal shape, the third receiving coil has a sinusoidal shape, and the fourth receiving coil has a co-sinusoidal shape.

17. The system of claim 1, wherein the first track includes a plurality of first features, at least two of the plurality of first features having different respective lengths.

18. The system of claim 1, wherein the first magnetic field signal is off-phase from the second magnetic field signal by either 90 degrees or 120 degrees.

19. The system of claim 18, wherein the first magnetic field signal is off-phase from the second magnetic field signal by either 90 degrees or 120 degrees.

20. A system comprising:

a target having a first track and a second track, the first track including one or more first features, and the second track including one or more second features, the target having a respective target length;

a first receiving coil that is aligned with the first track, the first receiving coil having a first period length, the first receiving coil being configured to sense a first reflected magnetic field that is generated by any of the first features, the first receiving coil being configured to generate a first magnetic field signal in response to the first reflected magnetic field;

a second receiving coil that is aligned with the first track, the second receiving coil having a second period length, the second receiving coil being configured to sense the first reflected magnetic field, the second receiving coil being configured to generate a second magnetic field signal in response to the first reflected magnetic field, the second magnetic field signal being off-phase from the first magnetic field signal;

a third receiving coil that is aligned with the second track, the third receiving coil having a third period length, the third receiving coil being configured to sense a second reflected magnetic field that is generated by any of the second features, the third receiving coil being configured to generate a third magnetic field signal in response to the second reflected magnetic field; and a fourth receiving coil that is aligned with the second track, the fourth receiving coil having a fourth period length, the fourth receiving coil being configured to sense the second reflected magnetic field, the fourth receiving coil being configured to generate a fourth magnetic field signal in response to the second reflected magnetic field, the fourth magnetic field signal being off-phase from the third magnetic field signal; and a magnetic field sensor that is configured to generate an output signal that is indicative of a position of the target, the output signal being generated based on the first magnetic field signal, the second magnetic field signal, the third magnetic field signal, and the fourth magnetic field signal, wherein the respective target length is less than any of the first period length, the second period length, the third period length, and the fourth period length, wherein, the target is spaced apart from the first receiving coil, the second receiving coil, the third receiving coil, and the fourth receiving coil, and wherein the target is configured to travel along each of the first receiving coil, the second receiving coil, the third receiving coil, and the fourth receiving coil.

21. The system of claim 20, wherein the respective target length is substantially equal to one half of any of the first period length, the second period length, the third period length, and the fourth period length.

22. The system of claim 20, wherein:
the first receiving coil includes a plurality of first lobes;
the second receiving coil includes a plurality of second lobes;
the third receiving coil includes a plurality of third lobes, any of the plurality of third lobes having a larger size than any of the plurality of first lobes and any of the plurality of second lobes, and
the fourth receiving coil includes a plurality of fourth lobes, any of the plurality of fourth lobes having a larger size than any of the plurality of first lobes and any of the plurality of second lobes.

23. The system of claim 20, wherein:
the first receiving coil includes a plurality of first lobes;
the second receiving coil includes a plurality of second lobes;
the third receiving coil includes a plurality of third lobes, each of the plurality of third lobes being offset, along a path of travel of the target, from each of the plurality of first lobes and each of the plurality of second lobes, and the fourth receiving coil includes a plurality of fourth lobes, each of the plurality of fourth lobes being offset, along the path of travel of the target, from each of the plurality of first lobes and each of the plurality of second lobes.

24. The system of claim 20, wherein:
the first receiving coil includes a first end portion, a second end portion, and a middle portion that is disposed between the first end portion and the second end portion;
the target is configured to travel over the middle portion only, such that the target is configured to stay aside from first end portion and the second end portion.

25. The system of claim 20, wherein the first track includes N first features and the second track includes N+1 features, wherein N is a positive integer greater than or equal to 1.

26. The system of claim 20, wherein each of the one or more first features has a smaller size than any of the one or more second features.

27. The system of claim 20, wherein the first receiving coil has a periodic shape, and the target is configured to travel over or below each of a plurality of periods of the first receiving coil, except for one or more periods that are situated in a first end of the first receiving coil and one or more periods that are situated in a second end of the first receiving coil.

28. The system of claim 20, further comprising a first transmitting coil and a second transmitting coil, wherein the first reflected magnetic field is transmitted in response to a first excitation magnetic field that is produced by the first transmitting coil and the second reflected magnetic field is generated in response to a second excitation magnetic field that is produced by the second transmitting coil.

29. The system of claim 20, wherein the first track includes only one first feature and the second track includes only one second feature.

30. The system of claim 20, wherein the first track includes a plurality of first features and the second track includes a plurality of second features.

* * * * *